US011140832B2

(12) United States Patent
Devroe et al.

(10) Patent No.: US 11,140,832 B2
(45) Date of Patent: Oct. 12, 2021

(54) AGRICULTURAL BALER

(71) Applicant: CNH Industrial America LLC, New Holland, PA (US)

(72) Inventors: Jeroen Devroe, Izegem (BE); Dieter Kindt, Vladslo (BE); Bram Rosseel, Snellegem (BE); Jeng Mooren, Wijtschate (BE)

(73) Assignee: CNH Industrial America LLC, New Holland, PA (US)

( * ) Notice: Subject to any disclaimer, the term of this patent is extended or adjusted under 35 U.S.C. 154(b) by 112 days.

(21) Appl. No.: 16/702,021

(22) Filed: Dec. 3, 2019

(65) Prior Publication Data

US 2020/0170191 A1    Jun. 4, 2020

(30) Foreign Application Priority Data

Dec. 3, 2018  (EP) ..................................... 18209819

(51) Int. Cl.
*A01F 15/04* (2006.01)
*A01F 15/10* (2006.01)
(Continued)

(52) U.S. Cl.
CPC ............ *A01F 15/10* (2013.01); *A01D 89/002* (2013.01); *A01F 15/042* (2013.01); *A01F 15/07* (2013.01);
(Continued)

(58) Field of Classification Search
CPC ........ A01F 15/04; A01F 15/042; A01F 15/07; A01F 15/10; A01F 15/101;
(Continued)

(56) References Cited

U.S. PATENT DOCUMENTS 4,275,550 A * 6/1981 Swenson ................. A01F 15/04
100/189
4,862,684 A * 9/1989 Naaktgeboren ....... A01F 15/101
56/341
(Continued)

FOREIGN PATENT DOCUMENTS

EP    0276496 A1    8/1988
EP    2281436 A1    2/2011
(Continued)

OTHER PUBLICATIONS

Extended European Search Report for EP Application No. 18209819.4 dated Jun. 24, 2019 (eight pages).

*Primary Examiner* — Jimmy T Nguyen
(74) *Attorney, Agent, or Firm* — Peter Zacharias; Patrick Sheldrake

(57) ABSTRACT

An agricultural baler including a bale chamber; a plunger; a feeder duct; and a rotor feeder unit. The rotor feeder unit includes a rotor feeder unit bottom distant from a rotor feeder forming a lower boundary of a conveying channel through the rotor feeder unit. The rotor feeder unit also includes scrapers placed in a conveying direction behind the rotor feeder. The scrapers extend in between the tines and have a leading face cooperating with the tines. The agricultural baler further includes a position adjuster configured to displace the leading face of the scrapers relative to the rotor feeder unit bottom, and to displace a top wall and/or the bottom wall of the feeder duct, in order to adjust the volume of the feeder duct.

19 Claims, 9 Drawing Sheets

(51) Int. Cl.
*A01D 89/00* (2006.01)
*A01F 15/07* (2006.01)

(52) U.S. Cl.
CPC ...... *A01F 15/101* (2013.01); *A01F 2015/102* (2013.01); *A01F 2015/107* (2013.01); *A01F 2015/108* (2013.01)

(58) Field of Classification Search
CPC .......... A01F 2015/102; A01F 2015/107; A01F 2015/108; A01D 89/002
See application file for complete search history.

(56) References Cited

U.S. PATENT DOCUMENTS

| 2016/0001294 | A1* | 1/2016 | Bergmann | B02C 13/286 |
| | | | | 56/344 |
| 2016/0219789 | A1* | 8/2016 | Derscheid | A01D 90/08 |
| 2017/0105353 | A1* | 4/2017 | Rosseel | A01D 89/00 |
| 2017/0105354 | A1* | 4/2017 | Rosseel | A01F 15/101 |

FOREIGN PATENT DOCUMENTS

| EP | 3158852 A1 | 4/2017 |
| EP | 3158855 A1 | 4/2017 |
| WO | 2017/068058 A1 | 4/2017 |

\* cited by examiner

AGRICULTURAL BALER

FIELD OF THE INVENTION

The present invention relates to agricultural balers, and more specifically to rectangular balers, that is, balers that produce bales of crop material that are rectangular in side view, and to a method relating to the operation of such a baler.

SUMMARY OF THE INVENTION

According to a first embodiment of the invention there is provided an agricultural baler, comprising:

a bale chamber for the compression of crop material into bales, the bale chamber having a floor, a ceiling, a first wall and a second wall, wherein a bale forming direction of the bale chamber extends from an inlet end to an outlet end of the bale chamber, and wherein the floor comprises an inlet opening;

a plunger for forcing the crop material from the inlet end of the bale chamber towards the outlet end of the bale chamber;

a feeder duct communicating with the bale chamber through the inlet opening for charges of crop material to be transferred from the feeder duct into the bale chamber, wherein the feeder duct has an upper end facing generally upwardly and communicating with the inlet opening in the bale chamber and a lower end facing generally in a forward direction, the feeder duct has a top wall and a bottom wall extending between the lower end and the upper end of the feeder duct, wherein the top wall and/or the bottom wall are movable in order to adjust the volume of the feeder duct;

a rotor feeder unit comprising:

a rotor feeder carrying a set of tines, said rotor feeder being rotatable about an axis of rotation;

a rotor feeder unit bottom distant from the rotor feeder forming a lower boundary of a conveying channel through the rotor feeder unit; and scrapers placed in a conveying direction behind the rotor feeder, the scrapers extending in between the tines and having a leading face cooperating with the tines; and a position adjuster configured to:

displace the leading face of the scrapers relative to the rotor feeder unit bottom, and displace the top wall and/or the bottom wall of the feeder duct, in order to adjust the volume of the feeder duct.

Using such a position adjuster to displace the top and/or bottom walls of the feeder duct, and also the leading face of the scrapers can enable improved operation of the baler during a baling operation in terms of improved efficiency and/or quality of bales.

The position adjuster may be configured to displace the leading face of the scrapers and the top wall and/or the bottom wall of the feeder duct in dependence on each other.

The position adjuster may be configured to rotate the scrapers about an axis of rotation in order to adjust the cross-sectional profile of the conveying channel as it extends in a conveying direction through the rotor feeder unit.

The position adjuster may be configured to rotate the scrapers about an axis of rotation that is offset from an axis of rotation of the rotor feeder, for angularly displacing the leading face of the scrapers relative to the rotor feeder unit bottom.

A path of movement of a distal edge of the leading face may correspond to a path of movement of a distal edge of the top wall.

The position adjuster may be configured to displace the leading face of the scrapers and the top wall of the feeder duct so as to provide a generally smooth transition between the leading face and the top wall.

The top wall may be mechanically connected to the scrapers.

The agricultural baler may further comprise a controller configured to activate the position adjuster. The controller may be configured to activate the position adjuster during a baling operation. The controller may be configured to activate the position adjuster at one or more instants in time during an operational cycle of the baler.

The baler may further comprise a stuffer means operable to convey crop material from the feeder duct through the inlet opening and into the bale chamber. The controller may be configured to activate the one or more actuators at one or more predetermined instants in time during a stuffer cycle of the stuffer means.

The stuffer means may comprise stuffer-tines that are movable from a stuffer-tine-start-position at the lower end of the feeder duct to a stuffer-tine-end-position at the upper end of the feeder duct. The stuffer cycle may comprise movement of the stuffer-tines from the stuffer-tine-start-position to the stuffer-tine-end-position, along the feeder duct, in order to convey crop material from the feeder duct through the inlet opening and into the bale chamber.

The controller may be configured to activate the one or more actuators to increase the volume of the feeder duct at a release-instant-in-time. The release-instant-in-time may be immediately before movement of the stuffer-tines from the stuffer-tine-start-position to the stuffer-tine-end-position.

At the release-instant-in-time, the controller may be configured to activate the one or more actuators to move the top wall and the bottom wall further apart from each other at the upper end of the feeder duct.

The controller may be configured to activate the one or more actuators to decrease the volume of the feeder duct at a compress-instant-in-time. The compress-instant-in-time may be immediately before the release-instant-in-time.

At the compress-instant-in-time, the controller may be configured to activate the one or more actuators to move the top wall and the bottom wall closer together at the upper end of the feeder duct.

The controller may be configured to activate the one or more actuators to define a feeder duct that has a variable cross-sectional area along its length in between stuffer cycles.

The controller may be configured to activate the one or more actuators to define a feeder duct having a funnel-configuration which has at least a portion of decreasing cross-sectional area from the lower end to the upper end, in between stuffer cycles.

The controller may be configured to activate the one or more actuators to define a feeder duct having a parallel-configuration that has a substantially consistent cross-sectional area from the lower end to the upper end, in between stuffer cycles and after the feeder duct has been controlled to have a funnel-configuration.

The controller may be configured to activate the one or more actuators to define a feeder duct having a reverse-funnel-configuration, for which at least a portion of the feeder duct has an increasing cross-sectional area in a direction from the lower end to the upper end of the feeder duct, at an instant in time that is a predetermined period of time from an end of the stuffer cycle at which stuffer-tines are at a stuffer-tine-end-position.

The baler may further comprise: a feeder means operable to convey crop material from the lower end of the feeder duct toward the upper end. The controller may be configured to activate the one or more actuators at one or more predetermined instants in time during a feeder cycle of the feeder means.

The feeder means may comprise feeder-tines that are movable from a feeder-tine-start-position at the lower end of the feeder duct along the feeder duct towards a feeder-tine-end-position. The feeder cycle may comprise movement of the feeder-tines from the feeder-start-position towards the feeder-tine-end-position, in order to compress crop material in the feeder duct.

The controller may be configured to activate the one or more actuators at one or more predetermined instants in time during a plunger cycle of the plunger.

The plunger cycle may comprise movement of the plunger from: (i) a retracted position, in which the plunger is at the inlet end of the bale chamber; to (ii) an extended position, in which the plunger is closer to the outlet end of the bale chamber.

The controller may be configured to activate the one or more actuators to increase the volume of the feeder duct at a release-instant-in-time. The release-instant-in-time may be immediately before the plunger moves from the retracted position towards the extended position.

The controller may be configured to activate the one or more actuators to decrease the volume of the feeder duct at a compress-instant-in-time. The compress-instant-in-time may be immediately before the release-instant-in-time.

The agricultural baler may further comprise a controller configured for controlling the position adjuster and at least one sensor for measuring at least one operational parameter of the rotor feeder unit or of the agricultural baler in which the rotor feeder unit is arranged. The controller may be configured for receiving measuring data from said sensor and for displacing the leading face of the scrapers relative to the rotor feeder unit bottom and/or the top wall/bottom wall of the feeder duct based on said at least one operational parameter. This can allow for automated displacement to different conditions of operation of the rotor feeder unit or of an agricultural machine in which the rotor feeder unit is arranged.

Said at least one operational parameter may include a parameter related to the mechanical load on the rotor feeder unit during operation. This can allow for automated displacement based on the mechanical load on the rotor feeder unit during operation. It is for instance foreseen that the controller can be configured such that the leading face of the scrapers is displaced relative to the rotor feeder unit bottom to the effect that the reverse funnel shape of the end of the conveying channel is widened in case the load on the rotor exceeds a certain predetermined value. The at least one operational parameter can include rotor torque.

The position adjuster may be adapted for allowing displacement of the leading face of the scrapers relative to the rotor feeder unit bottom as a function of the force exerted by crop material on the leading face of the scrapers. By measuring the displacement of the leading face of the scrapers relative to the rotor feeder unit bottom is thus possible to monitor the force exerted by the crop material on the scrapers as an indication of the crop pressure downstream of the rotor feeder. This information can advantageously be used in the control of other implements of the agricultural machine. When for instance there is an indication that the crop pressure is too low, the supply rate of crop material to the rotor feeder unit is too low. By subsequently controlling the agricultural machine or the vehicle that moves the agricultural machine over the ground to increase the speed over the ground the supply rate of crop material to the rotor feeder unit is increased, such that the crop pressure downstream of the rotor feeder is increased. The position adjuster may for instance be provided with pretension means, in particular a spring or the like, that forces the scrapers and/or a wall of the feeder duct into a certain position with a certain pretension opposite to the force that is exerted by the crop material on the scrapers. Once the force exerted on the scrapers/wall by the crop material exceeds the pretension, the crop material will displace the scrapers/wall. The displacement can be monitored and measured by means of a sensor adapted for measuring the displacement of the scrapers/wall, and on the basis of the measured displacement a controller can subsequently control the operation of the agricultural machine.

According to a further embodiment, there is provided a method for operating an agricultural baler, the baler comprising:

a bale chamber for the compression of crop material into bales, the bale chamber having a floor, a ceiling, a first wall and a second wall, wherein a bale forming direction of the bale chamber extends from an inlet end to an outlet end of the bale chamber, and wherein the floor comprises an inlet opening;

a plunger for forcing the crop material from the inlet end of the bale chamber towards the outlet end of the bale chamber;

a feeder duct communicating with the bale chamber through the inlet opening for charges of crop material to be transferred from the feeder duct into the bale chamber, wherein the feeder duct has an upper end facing generally upwardly and communicating with the inlet opening in the bale chamber and a lower end facing generally in a forward direction, the feeder duct has a top wall and a bottom wall extending between the lower end and the upper end of the feeder duct, wherein the top wall and/or the bottom wall are movable in order to adjust the volume of the feeder duct;

a rotor feeder unit comprising:

a rotor feeder carrying a set of tines, said rotor feeder being rotatable about an axis of rotation;

a rotor feeder unit bottom distant from the rotor feeder forming a lower boundary of a conveying channel through the rotor feeder unit; and scrapers placed in a conveying direction behind the rotor feeder, the scrapers extending in between the tines and having a leading face cooperating with the tines; and wherein the method comprises:

displacing the leading face of the scrapers relative to the rotor feeder unit bottom, and displacing the top wall and/or the bottom wall of the feeder duct, in order to adjust the volume of the feeder duct.

The method may comprise reducing or increasing the mechanical load on the rotor feeder unit by displacing the leading face of the scrapers relative to the rotor feeder unit bottom and/or displacing a wall of the feeder duct. Displacing the leading face of the scrapers relative to the rotor feeder unit bottom can advantageously be employed for removing a plugging of the rotor feeder. By widening the reverse funnel shape defined by the leading face of the scrapers and the bottom wall of the rotor feeder unit, a plug of crop material can be more easily removed.

Displacing the leading face of the scrapers relative to the rotor feeder unit bottom and/or a wall of the feeder duct can advantageously be employed for improving the density of the crop material downstream of the rotor feeder by increasing or decreasing the crop flow velocity. In case the rotor feeder unit feeds the feeder duct of a rectangular baler, the density of the crop material in the feeder duct may thus be advantageously improved.

The one or more actuators may be one or more mechanical actuators. The one or more actuators may be configured to provide the feeder-duct with a funnel-configuration and/or a reverse-funnel-configuration.

The baler may comprise a scraper position adjusting arrangement configured to displace the leading face of the scrapers relative to the rotor feeder unit bottom.

The leading face of the scrapers may cooperate with the tines to remove the crop material from the tines and guide it further in the conveying direction through the conveying channel. The leading face of the scrapers thereby may form an upper boundary of the conveying channel through the rotor feeder unit. In order for the scrapers to effectively guide the crop material further in the conveying direction, the shape of the end of the conveying channel formed between the leading face of the scrapers and the rotor feeder unit bottom, in particular in a plane perpendicular to the axis of rotation of the rotor feeder, may be that of a reverse funnel. The scraper position adjuster may allow for displacing the leading face of the scrapers relative to the rotor feeder unit bottom, thereby adjusting the reverse funnel shape of the end of the conveying channel formed between the leading face of the scrapers and the rotor feeder unit bottom. By displacement of the leading face of the scrapers relative to the rotor feeder unit bottom, in particular in a plane perpendicular to the axis of rotation of the rotor, the reverse funnel shape of the end of the conveying channel can be widened or narrowed. Widening or narrowing the reverse funnel shape of the end of the conveying channel can change the velocity of the flow of cut crop material exiting the conveying channel. Moreover, widening the reverse funnel shape of the end of the conveying channel can reduce the back pressure exerted by the crop material on the rotor, thereby reducing the power required to drive the rotor. Narrowing the reverse funnel shape of the end of the conveying channel provides the opposite. The position adjuster may allow for adjusting the reverse funnel shape of the end of the conveying channel to specific operational circumstances. For instance, in case of more dense crop material, for instance wet crop material, widening the reverse funnel shape of the end of the conveying channel by adjusting the position of the leading face of the scrapers relative to the rotor feeder unit bottom, can allow for compensation of the increased power that is required for conveying such dense crop material through the end of the conveying channel.

The position adjuster may be adapted for rotating the scrapers about the axis of rotation of the rotor for angularly displacing the leading face of the scrapers relative to the rotor feeder unit bottom. This feature can allow for angularly displacing the leading face of the scrapers relative to the rotor feeder unit bottom without adjusting the so-called scraper angle, i.e. the angle of the leading face of the scrapers relative to the leading face of the tines. This can have the advantage that displacing the leading face of the scrapers relative to the rotor feeder unit bottom does not affect the angle between the leading face of the tines and the leading face of scrapers, thereby leaving the cooperative action of the tines and the scrapers unaffected.

Alternatively, or additionally, the position adjuster may be adapted for displacing the leading face of the scrapers relative to the rotor feeder unit bottom such that the angle of the leading face of the scrapers relative to the leading face of the tines is adjusted. In order to allow for adjusting the angle of the leading face of the scrapers relative to the leading face of the tines, the position adjuster may be provided with an arrangement for translating the leading face of the scrapers relative to the axis of rotation of the rotor feeder and/or rotating the leading face of the scrapers around an axis of rotation offset from the axis of rotation of the rotor feeder. The extent of adjustment of the angle of the leading face of the scrapers relative to the leading face of the tines can depend on the extent of displacement of the leading face of the scrapers relative to the rotor feeder unit bottom and on the shape of the leading face of the scrapers. In view of the latter, the leading face of the scrapers may advantageously be shaped such that a certain translation of the leading face of the scrapers relative to the axis of rotation of the rotor feeder and/or rotation of the leading face of the scrapers around an axis of rotation offset from the axis of rotation of the rotor feeder, can result in a specific angle of the leading face of the scrapers relative to the leading face of the tines.

The position adjuster may comprise a scraper bar having the scrapers arranged thereon and having a longitudinal axis extending substantially parallel to the axis of rotation of the rotor, a guide defining a path along which the scraper bar is movable, and arresting means for arresting the scraper bar in a position along said path. This arrangement can allow for effective displacement of the leading face of the scrapers relative to the rotor feeder unit bottom for all scrapers at once.

The guide can define a path for at least three points of the scraper bar in a plane perpendicular to the longitudinal axis of the scraper bar. This advantageous feature can provide an effective guide wherein for each position along the path a specific angle of the scraper bar relative to the rotor feeder unit bottom is defined. This feature can be particularly effective to adapt the position adjuster for rotating the scrapers about the axis of rotation of the rotor.

The guide may comprise at least one slot in opposing side walls of the rotor feeder unit between which side walls the scraper bar extends. The at least three points of the scraper bar may be defined by guiding pins arranged on the scraper bar and extending in the at least one slot. Although one slot could be provided for guiding all guiding pins, in some examples a slot is provided for each guiding pin.

The position adjuster may be adapted for manual operation thereof.

The position adjuster may comprise an actuator acting on the scrapers and configured for displacing the leading face of the scrapers relative to the rotor feeder unit bottom. Such an actuator could be provided to allow manual operation of the position adjuster from a remote location, for instance from an operator console. Moreover, providing an actuator acting on the scrapers and configured for adjusting the position of the leading face of the scrapers relative to the rotor feeder unit bottom, can allow for displacement of the leading face during operation of the rotor unit.

BRIEF DESCRIPTION OF THE DRAWINGS

Embodiments of the present invention will now be described by way of example and with reference to the accompanying drawings in which.

DETAILED DESCRIPTION OF THE DRAWINGS

Figure 1:
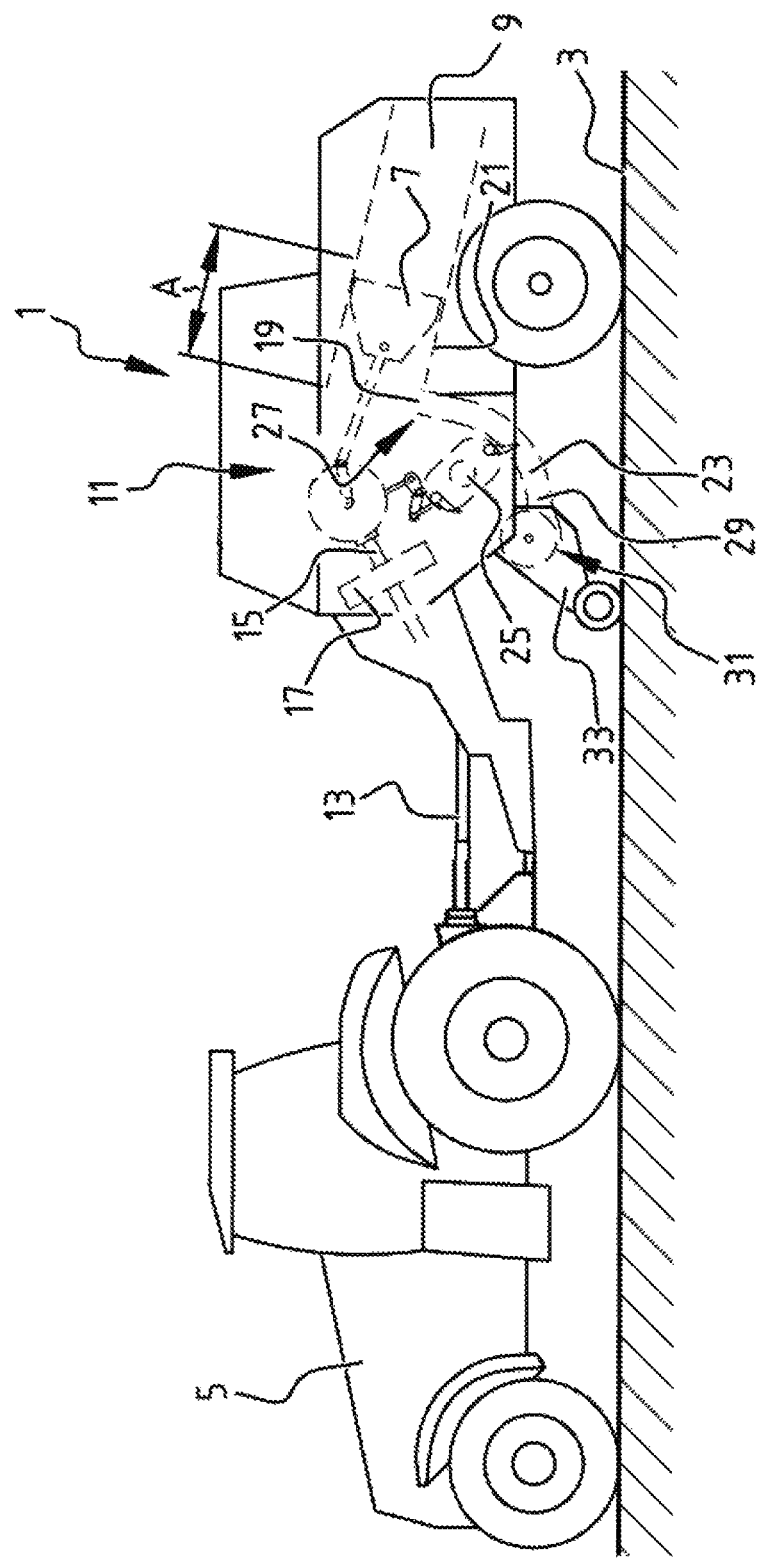
FIG. 1 shows a rectangular agricultural baler.

FIG. 1 shows a rectangular agricultural baler 1. The baler 1 can be moved forward over a ground surface 3 by means of a tractor 5.

The baler 1 has a bale chamber 9, in which crop material is compressed into bales. The bale chamber 9 has a floor, a ceiling, a first wall and a second wall. A bale forming direction of the bale chamber 9 extends from an inlet end to an outlet end of the bale chamber 9. The baler 1 is provided with a plunger 7 that during operation is moved reciprocally along a linear path A in the bale chamber 9 by means of a crank mechanism 11 connected to the plunger 7. In this way, the plunger 7 forces the crop material from the inlet end of the bale chamber towards the outlet end of the bale chamber. A plunger cycle includes movement of the plunger 7 from: (i) a retracted position, in which the plunger 7 is at the inlet end of the bale chamber 9; to (ii) an extended position, in which the plunger 7 is closer to the outlet end of the bale chamber 9.

The crank mechanism 11 is connected for driving via a drive shaft 13 to the motor of the tractor 5. The tractor 5 is provided for this purpose with a power take-off device, also referred to as PTO. The drive shaft 13 connects an output shaft of the PTO of the tractor 5 to an input shaft 15 of the crank mechanism 11. A flywheel 17 is arranged on the input shaft of the crank mechanism.

A feeder duct 23 communicates with the bale chamber 9 through the inlet opening 19 for charges of crop material to be transferred from the feeder duct 23 into the bale chamber 9. Feeder means 25 are operable within the feeder duct 23 to accumulate a charge of crop material therein and then stuff that accumulated charge into the bale chamber 9. The feeder duct 23 can also be referred to as a pre-compression chamber (PCC) because it defines a volume in which the crop material is compressed before being moved into the bale chamber 9.

The feeder duct 23 has an upper end 27 facing generally upwardly and communicating with the inlet opening 19 in the bale chamber 9, and a lower end 29 facing generally in a forward direction and communicating with a rotor feeder unit 31. The rotor feeder 31 in this example is a cutting unit that is arranged for cutting crop material supplied by a pick-up device 33 and to convey the cut crop material into the feeder duct 23.

Figure 2:
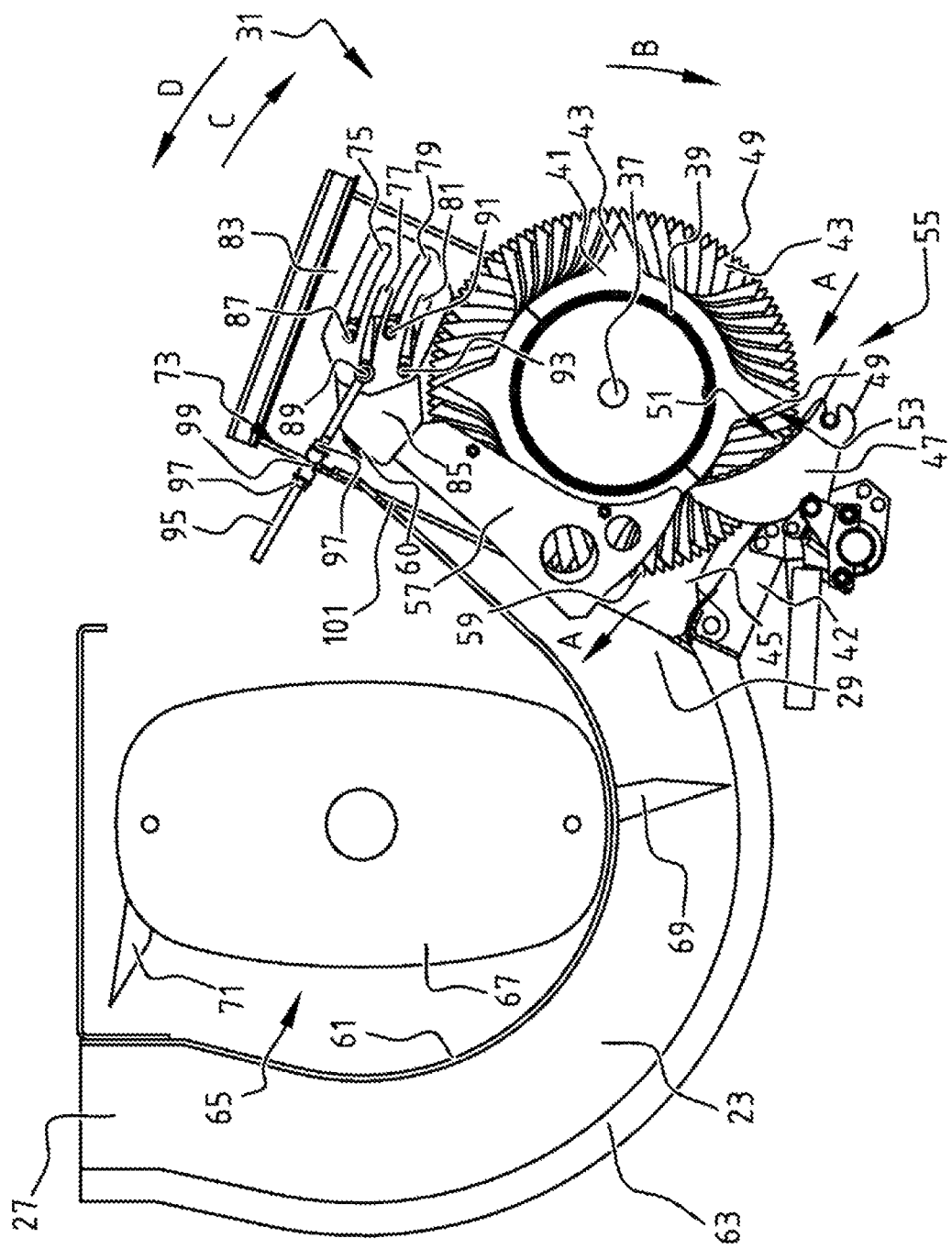
FIG. 2 shows in schematic side view the rotor feeder unit arranged in the rectangular baler of FIG. 1.
Figure 3:
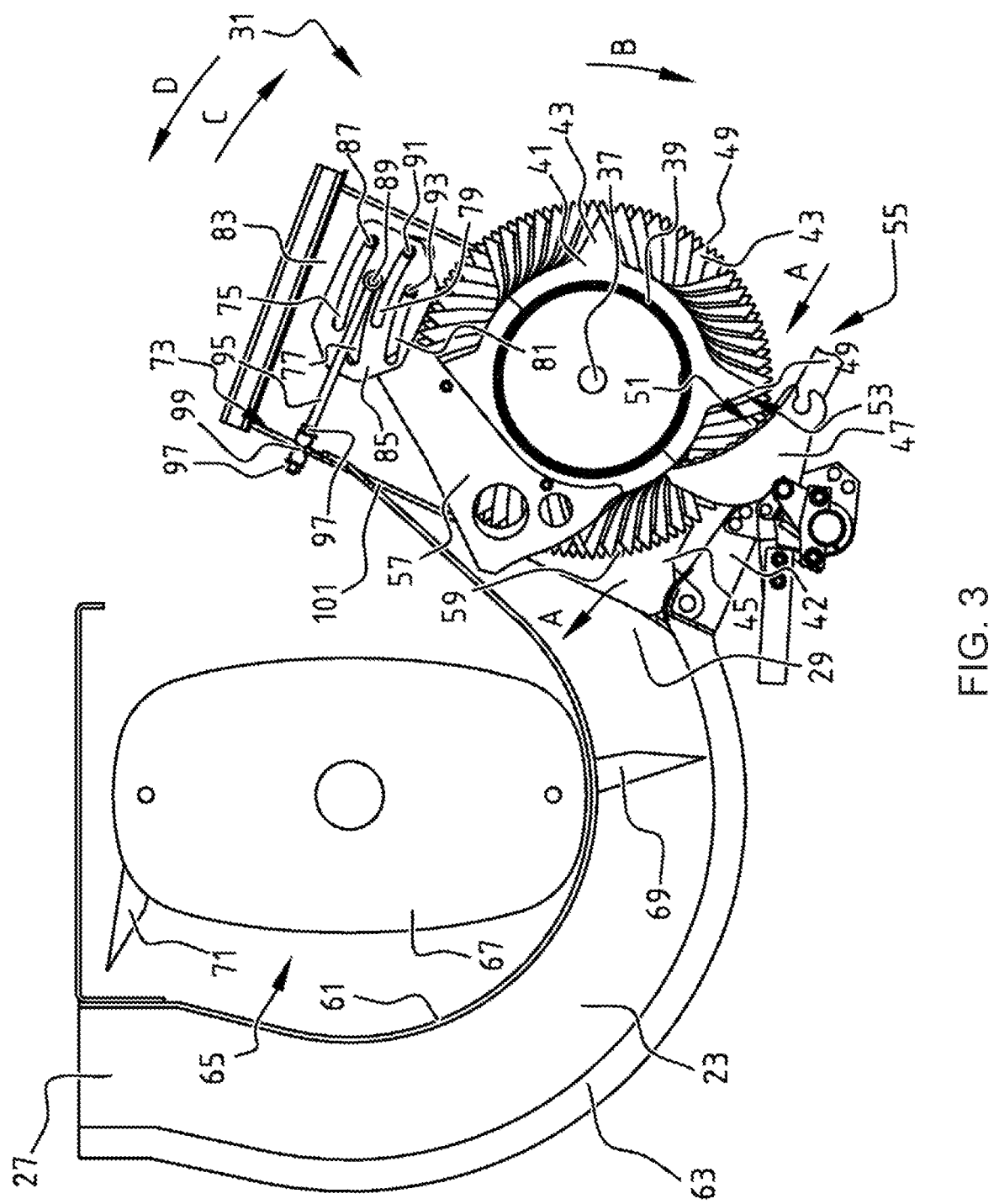
FIG. 3 shows in schematic side view the rotor feeder unit of FIG. 2 with the scrapers arranged in a different position.

In FIGS. 2 and 3 the rotor feeder unit 31 is shown in more detail. The rotor feeder unit 31 is provided with a rotor feeder 33 carrying a set of tines 43. The rotor feeder 33 is rotatable about an axis of rotation 37. The rotor feeder 33 has a cylindrical base body 39 carrying tine plates 41 each including a plurality of tines 43. The tine plates 41 are parallel to each other in planes perpendicular to the axis of rotation 37 and distributed in the direction of the axis of rotation 37 of the base body 39 with intermediate distances in between.

A rotor feeder unit bottom 42, distant from the rotor feeder 33, forms a lower boundary of a conveying channel 45 through the rotor feeder unit 31. Cutting blades 47 protrude from the rotor feeder unit bottom 42 through the conveying channel 45 besides moving paths of the tine tips 49. The cutting blades 47 are parallel to each other in planes perpendicular to the axis of rotation 37 and distributed in the direction of the axis of rotation 37 with intermediate distances in between, such that each cutting blade 47 extends between two successive tine plates 41. Cutting edges 51 of the cutting blades 47 are oriented to counter the conveying direction A in the conveying channel 45 as defined by the direction B of rotation of the rotor feeder 33. The cutting edges 51 of the cutting blades 47 cooperate with the leading faces 53 of the tines 43 to cut crop material that is fed to the rotor feeder 33 at the inlet 55 of the conveying channel 45. The rotor feeder unit 31 is in the shown embodiment arranged for cutting crop material and may thus be referred to as a rotor cutter unit. Alternatively, the rotor feeder unit 31 may not have cutting blades 47. For example, the rotor feeder unit 31 can be provided as a packing unit that does not cut the crop. As a further alternative, the cutting blades 47 may be retractable from the conveying channel 45.

Scrapers 57 are placed in conveying direction A behind the rotor feeder 33. The scrapers 57 are mounted on a scraper bar 60 extending substantially parallel to the axis of rotation 37 of the rotor feeder 33. The scrapers 57 are parallel to each other in planes perpendicular to the axis of rotation 37 and distributed in the direction of the axis of rotation 37 with intermediate distances in between, such that each scraper 57 extends between two successive tine plates 41. Leading faces 59 of the scrapers 57 are oriented to counter the leading faces 53 of the tines 43 as the rotor feeder 33 is rotated in the direction of rotation B thereof. The leading faces 59 of the scrapers 57 and the leading faces 53 of the tines 43 cooperate to convey the cut crop material in conveying direction A toward the inlet of feeder duct 23. In particular, the scrapers 57 remove the crop material from the tines 43 as the tines pass the scrapers 57.

The feeder duct 23 is defined between a feeder duct upper wall 61 and feeder duct bottom wall 63. The feeder means 65 includes a rotatable drum 67 having tines 69, 71 arranged thereon that are operable to convey cut crop material that has been conveyed by the rotor feeder unit 31 into the lower end 29 of the feeder duct 23, from the lower end 29 of the feeder duct 23 toward the upper end 27. Further details of the feeder duct 23 and feeder means 65 will be provided below with reference to FIGS. 5a and 5b in particular.

At the end of the conveying channel 45, the rotor feeder unit bottom 42 forms the lower boundary of the conveying channel 45 through the rotor feeder unit 31, while the leading faces 59 of the scrapers 57 form the upper boundary of the conveying channel 45. As shown in FIG. 2, the distance between the rotor feeder unit bottom 42 and the leading face 59 of the scrapers 57 in a plane perpendicular to the axis of rotation 37 of the rotor 31 increases in conveying direction A. As a result, the end of the conveying channel 45 that is in communication with, and that opens up into, the lower end 29 of the feeder duct 23 has a reverse-funnel shape in said plane perpendicular to the axis of rotation 37 of the rotor feeder 33.

The rotor feeder unit 31 is provided with a scraper position adjuster 73. The scraper position adjuster 73 includes the scraper bar 60 having the scrapers 57 arranged thereon. The scraper position adjuster 73 further includes a guide in the form of four slots 75, 77, 79, and 81 in opposing side walls 83 of the rotor feeder unit 31 between which side walls the scraper bar 57 extends. The scraper bar 60 is mounted at each end thereof on a mounting plate 85 that is parallel to the side walls 83. Each mounting plate 85 is provided with four guiding pins 87, 89, 91, 93 that each extends in one of the slots 75, 77, 79, and 81. The guiding pins 87, 89, 91, 93 and the slots 75, 77, 79, and 81, cooperate to define a path along which the scraper bar 60 is movable. For moving the scraper bar 60 along the path and arresting the scraper bar 60 at a desired location along said path, studs 95 are provided at each end of the scraper bar 60 that engage at one end the mounting plate 85 and that along the length thereof are in engagement with an adjusting assembly including two nuts 97 and a mounting member 99 mounted on a wall 101 of the rotor feeder unit. The mounting member 99 is rotatable relative to the wall 101 on which it is mounted and is provided with a hole through which the stud 95 extends. The nuts 97 are arranged on opposite sides of the mounting member 99. By turning the nuts 97, the scraper bar 60 is moved along the path defined by the slots and the guide pins. With both nuts 97 engaging the mounting member 99, the scraper bar 60 is arrested at a location along said path.

In this example, the slots 75, 77, 79, and 81 have a circular curve that has the axis of rotation 37 of the rotor feeder 33 as its centre. By moving the scraper bar 60 along the path, the scrapers 57 are rotated about the axis 37 of rotation of the rotor feeder 33. The rotation of the scrapers 57 about the axis 37 of rotation of the rotor feeder 33 results in an adjustment of the position of the leading face 59 of the scrapers 57 relative to the rotor feeder unit bottom 42. From the position of the scraper bar 60 shown in FIG. 2, a movement of the scraper bar 60 along the path in the direction of arrow C results an angular displacement of the scrapers 59 about the axis of rotation 37 of the rotor 33 in the direction of arrow C. As shown in FIG. 3, as a result thereof the reverse-funnel shape of the end of the conveying channel 45 that is defined by the rotor feeder unit bottom 42 and the leading face 59 of the scrapers 57 is widened. From the position of the scraper bar 60 shown in FIG. 3, a subsequent movement of the scraper bar 60 along the path in the direction of arrow D would result in an angular displacement of the scrapers 59 about the axis of rotation 37 of the rotor feeder 33 in the direction of arrow D. As a result thereof, the reverse-funnel shape of the end of the conveying channel 45 defined by the rotor feeder unit bottom 42 and the leading face 59 of the scrapers 57 would be narrowed.

In FIGS. 2 and 3, two extreme positions of the scraper bar 60 along the path are shown respectively. The scraper bar 60 can be arrested at any position along the path between the shown extreme positions.

Although in FIGS. 2 and 3 the slots 75, 77, 79, and 81 have a circular curve that has the axis of rotation 37 of the rotor feeder 33 as its centre, it would alternatively be possible that the circular curve of the slots 75, 77, 79, and 81 has as its centre an axis that is offset from the axis of rotation 37 of the rotor feeder 33. Moving the scraper bar 60 along the path, would then result in a rotation of the scrapers 57 around the offset axis of rotation. It would also be possible that the curve is not circular. It would even be possible that the slots are straight, such that by moving the scraper bar 60 along the path, the scrapers 57 are translated instead of rotated. It would also be possible that the slots are arranged in a plate that is itself arranged to be selectively moved relative to the side walls 83 of the rotor feeder unit 31 along a second path.

In an alternative of the embodiment shown in FIG. 2, a spring could be arranged between the mounting member 99 and the nut 97 on the left side of the mounting member 99, for positioning the scraper bar 60 along the path defined by the slots 75, 77, 79, 81 under a certain pretension. If during operation the force exerted on the leading face 59 of the scrapers 57 exceeds a certain value defined by the applied pretension, the scraper bar 60 is forced by the crop material to move along the path in the direction of arrow C. This forced displacement could advantageously be measured by means of a sensor as an indication of the force exerted by the crop material on the leading face 59 of the scrapers 57. This indication of the force exerted by the crop material on the leading face 59 of the scrapers 57 may be used by a controller that controls the operation of the baler.

In FIGS. 2 and 3, the scraper position adjuster 73 is configured for manual operation thereof.

Figure 4:
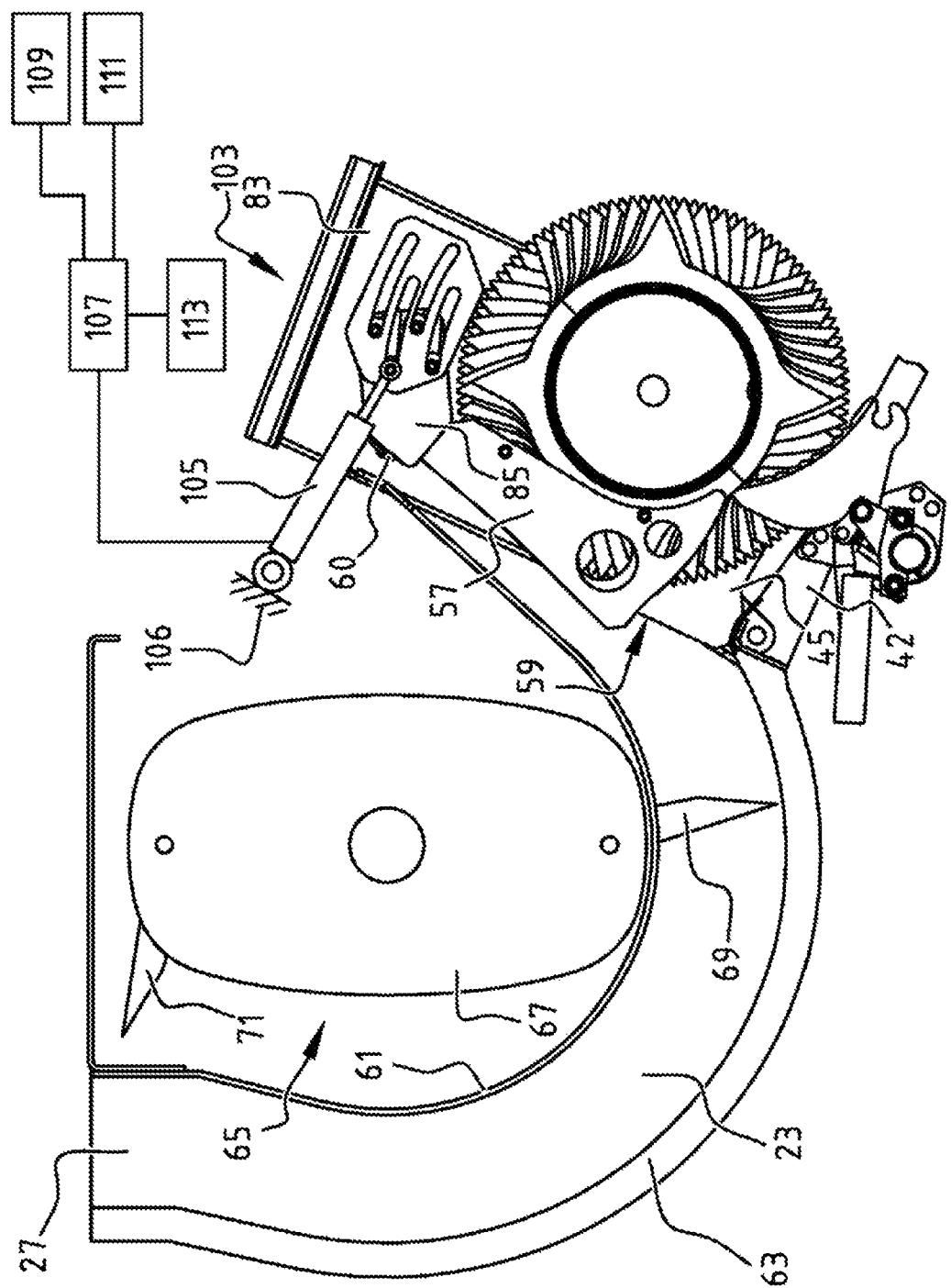
FIG. 4 shows in schematic side view an alternative embodiment of the rotor feeder unit shown in FIGS. 2 and 3.

FIG. 4 shows an alternative embodiment of the rotor feeder unit shown in FIG. 2, with a different scraper position adjuster 103. In particular, instead of studs 95 and an adjusting assembly including two nuts 97 and a mounting member 99, linear actuators 105 are provided at each end of the scraper bar 60. The linear actuator 105 engages at one end thereof the mounting plate 85 and is at the other end mounted on a mounting point 106 stationary relative to the side walls of the rotor feeder unit 31. The linear actuators 105 allow for moving the scraper bar 60 along the path by changing the length thereof and for arresting the scraper bar 60 at a desired location along said path by not changing the length thereof. The linear actuators 105 on either end of the scraper bar 60 are controlled in unison by means of a controller 107 that is connected with the linear actuators 105. The controller 107 is connected to an operator console 109, such that the operator of the baler 1 can remotely change the length of the linear actuator and therewith angularly displace the leading faces 59 of the scrapers 57 relative to the rotor feeder unit bottom 42.

Furthermore, the controller 107 is connected to sensor means 111 configured for sensing the orientation of the scrapers 57 relative to the rotor feeder unit bottom 42, such that the controller 107 can control the linear actuator based on sensor information regarding the orientation of the scrapers 57 relative to the rotor feeder unit bottom 42. Furthermore, the controller 107 is connected to a sensor 113 that is configured for sensing the torque on the rotor feeder 33, such that the controller 107 can control the linear actuator based on sensor information regarding the torque on the rotor feeder 33. For instance, the controller 107 can be configured to cause the reverse-funnel shaped end of the conveying channel 45 to widen in case the torque on the rotor feeder 33 exceeds a predetermined value.

Figure 5A:
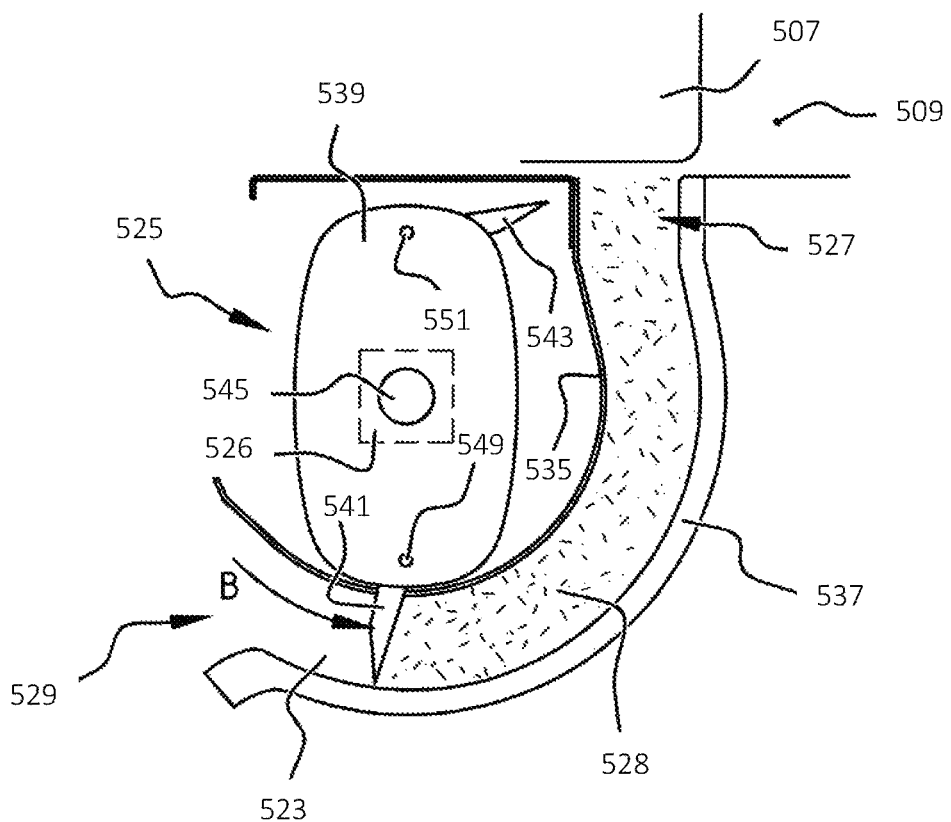
FIGS. 5a and 5b show the feeder duct during normal operation, in more detail.
Figure 5B:
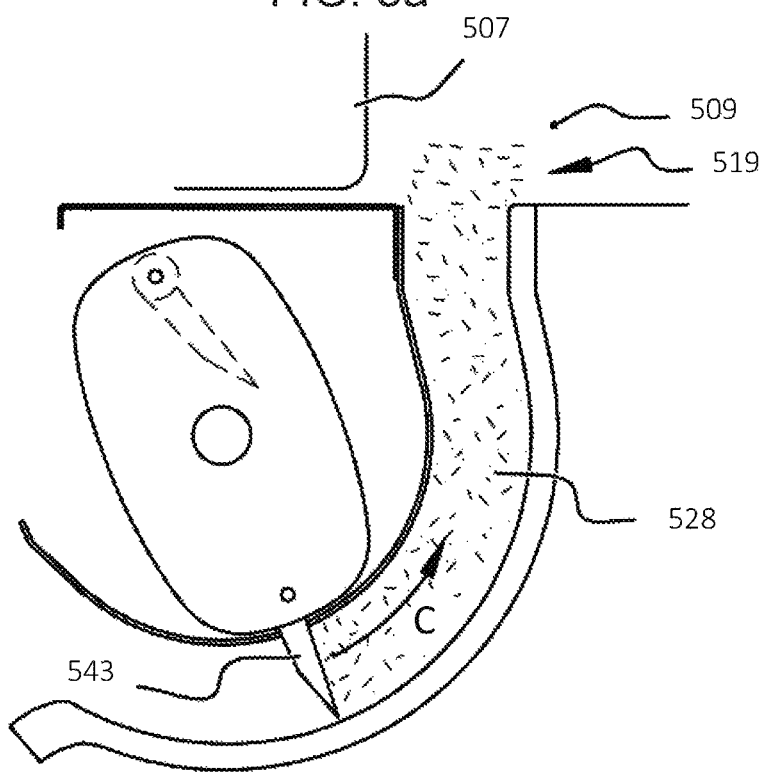

FIGS. 5a and 5b show the feeder duct 523 during normal operation, in more detail. The feeder duct 523 is defined between a feeder duct top wall 535 and feeder duct bottom wall 537. The top wall 535 and the bottom wall 537 extend between the lower end 529 and the upper end 527 of the feeder duct 523. The feeder duct top wall 535 provides an upper boundary for the feeder duct 523. The feeder duct bottom wall 537 provides a lower boundary for the feeder duct 523. Feeder means 525 are operable in the feeder duct 523. The feeder means 525 include a rotatable drum 539 having sets of tines 541, 543 arranged thereon. In operation, the drum 539 is rotated in the direction of arrow B about an axis of rotation 545.

The feeder means 525 further include a schematically shown drive 526. The drive 526 is arranged for rotating the drum 539 in the direction of arrow B about axis of rotation 545. The drive 526 further includes a mechanism for rotating the respective sets of tines 541, 543 relative to the drum 539 about a respective axis of rotation 549, 551, while the drum 539 is rotated in the direction of arrow B about its axis of rotation 545. This causes the outer ends of the tines 541, 543 to be moved along a path of movement. This path of movement may be a fixed path of movement or an adjustable path of movement, wherein the drive 526 comprises a mechanism for adjusting the path of movement of the sets of tines 541, 543, while the drum 539 is rotated in the direction of arrow B about axis of rotation 545.

During normal operation, the outer ends of the tines 541, 543 are caused to be moved along a path of movement through the feeder duct 523 in the direction indicated by arrow C, thereby conveying cut crop material that has been conveyed by the rotor feeder unit 31 (shown in FIG. 1) into the lower end 529 of the feeder duct 523, from the lower end 529 of the feeder duct 523 toward the upper end 527 thereof.

As illustrated by means of FIG. 5a, the feeder means 525 first accumulate a charge of crop material 528 in the feeder duct 523.

As illustrated by means of FIG. 5b, once the charge of crop material 528 has been accumulated, and the plunger 507 has cleared the inlet opening 519 of the bale chamber 509, the outer ends of the tines 543 are caused to be moved along a path of movement through the feeder duct 523 in the direction indicated by arrow C, thereby stuffing, i.e. conveying, the accumulated charge of crop material 528 through the opening 519 into the bale chamber 509.

It will be appreciated that different mechanisms can be used for accumulating the charge of crop material 528 in the feeder duct 523, and for stuffing/conveying, the accumulated charge of crop material 528 through the opening 519 into the bale chamber 509.

In this example, a single drum 539 has tines 541, 543 that are movable so that they can provide the functionality of both a feeder means (for compressing crop material in the feeder duct 523) and a stuffer means (for conveying crop material from the feeder duct 523 through the inlet opening 519 and into the bale chamber 509).

When the drum 539 and tines 541, 543 are operating as a stuffer means, the tines 541, 543 can be considered as stuffer-tines that are movable from a stuffer-tine-start-position at the lower end 529 of the feeder duct 523 to a stuffer-tine-end-position at the upper end 527 of the feeder duct 523. A stuffer cycle includes movement of the tines 541, 543 from the stuffer-tine-start-position to the stuffer-tine-end-position, along the feeder duct 523, in order to convey crop material from the feeder duct 523 through the inlet opening 519 and into the bale chamber 509. In this example, the tines 541, 543 are moved from the stuffer-tine-end-position back to the stuffer-tine-start-position, along a path that is outside of the feeder duct 523, in between stuffer cycles. In this way, the tines 541, 543 can be reset for the next stuffing cycle.

When the drum 539 and tines 541, 543 are operating as a feeder means, the tines 541, 543 can be considered as feeder-tines that are movable from a feeder-tine-start-position at the lower end 529 of the feeder duct 523 along the feeder duct 523 towards a feeder-tine-end-position. For such a feeder stroke (which may also be referred to as a packer stroke), the feeder means does not empty the feeder duct 523. Therefore, the feeder-tine-end-position is not necessarily at the end of the feeder duct 523; it can be at a predetermined position along the length of the feeder duct 523 (such as half way), or the feeder-tine-end-position can be at a variable position along the length of the feeder duct 523 (for example it can be dynamically set such that it varies with time or with density of crops, as non-limiting examples). A feeder cycle comprises movement of the tines 541, 543 from the feeder-start-position towards the feeder-tine-end-position, in order to compress crop material in the feeder duct 523.

Each of the above cycles are examples of an operational cycle of the baler.

Figure 6:
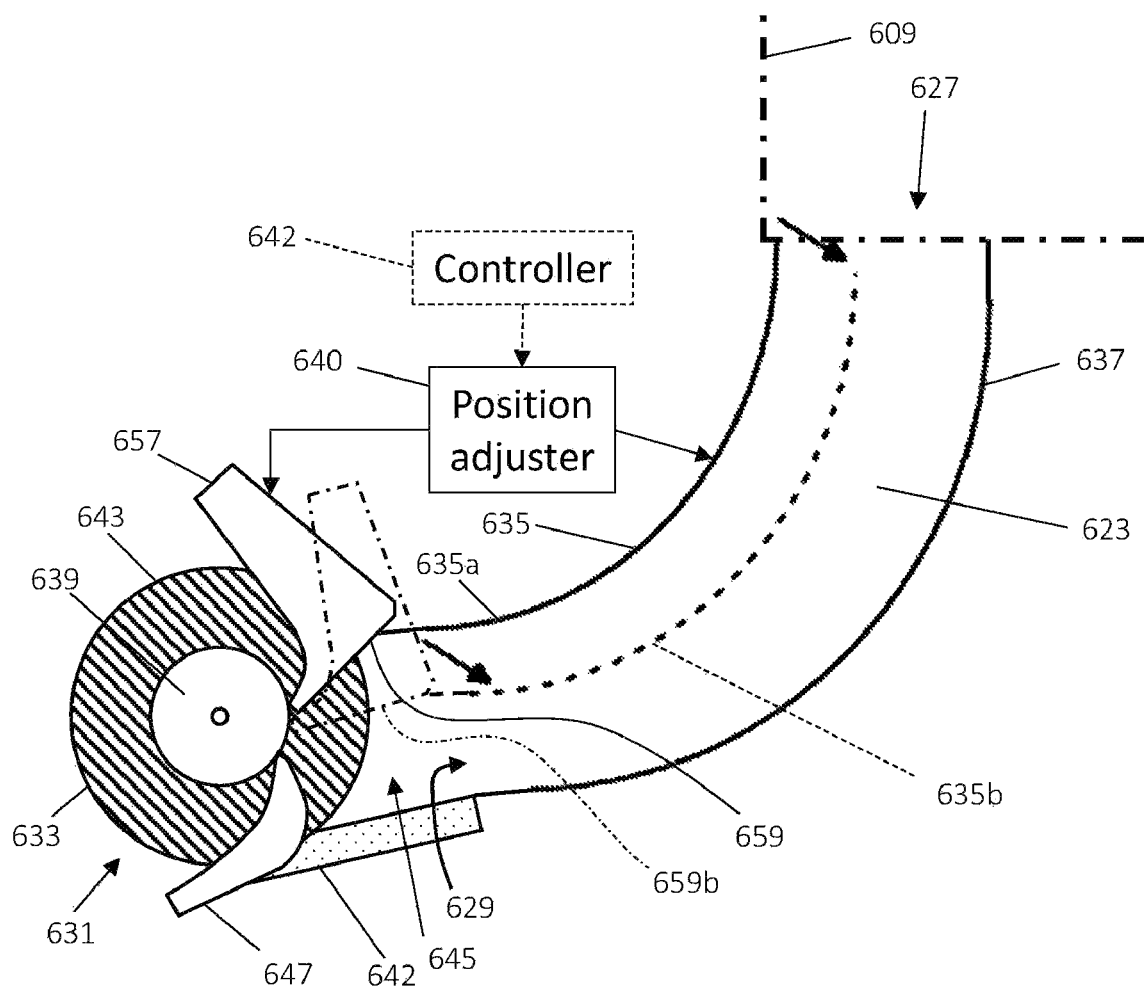
FIG. 6 shows part of an example embodiment of an agricultural baler, such as the baler illustrated in FIG. 1.

FIG. 6 shows part of an example embodiment of an agricultural baler, such as the baler illustrated in FIG. 1. FIG. 6 shows a feeder duct 623, a bale chamber 609, a position adjuster 640, a rotor feeder unit 631, and an optional controller 642.

The feeder duct 623 has a top wall 635 and a bottom wall 637. In this example, the top wall 635 is movable between a first position 635a (shown with a solid line in FIG. 6) and a second position 635b (shown with a dashed line in FIG. 6). In the first position 635a, the top wall 635 is further away from the bottom wall 637 than it is in the second position 635b. It will be appreciated that the top wall 635 can be positioned at any one of a plurality of positions, and that the first and second positions 635a, 635b are just two examples of different positions in which the top wall 635 can be located. The bottom wall 637 in this example is in a fixed position, for example fixed relative to the chassis of the baler. In this way, the top wall 635 is movable in order to adjust the volume of the feeder duct 623.

In the same way as described above, the rotor feeder unit 631 comprises a rotor feeder 633 that carries a set of tines 643. The rotor feeder 633 is rotatable about an axis of rotation. The rotor feeder unit 631 also includes a rotor feeder unit bottom 642, which is distant from the rotor feeder 633, and forms a lower boundary of a conveying channel 645 through the rotor feeder unit. The rotor feeder unit further includes scrapers 657 that are placed in a conveying direction behind the rotor feeder 633, such that the scrapers 657 extend in between the tines 643. The scrapers 657 have a leading face 659 that cooperates with the tines 643.

The leading face 659 of the scrapers 657 is movable relative to the rotor feeder unit bottom 642 between a first position (shown with a solid line in FIG. 6) and a second position 659b (shown with a dot-dashed line in FIG. 6). In the first position, the leading face 659 is further away from the rotor feeder unit bottom 642 than it is in the second position 659b. It will be appreciated that the leading face 659 of the scrapers 657 can be positioned at any one of a plurality of positions, and that the first and second positions 659, 659b are just two examples of different positions in which the leading face 659 of the scrapers 657 can be located. In this way, the leading face 659 of the scrapers 657 can be displaced relative to the rotor feeder unit bottom 642 such that the volume of the conveying channel 645 can be adjusted and/or the cross-sectional profile of the conveying channel 645 as it extends in the conveying direction through the rotor feeder unit 631.

The position adjuster 640 is configured to both: (i) displace the leading face 659 of the scrapers 657 relative to the rotor feeder unit bottom 642, and (ii) displace the top wall 635 of the feeder duct 623 in order to adjust the volume of the feeder duct 623. The position adjuster 640 can displace the top wall 635 and the leading face 659 of the scrapers 657 in dependence on each other. For instance:

the position adjuster 640 can apply a force to the top wall 635 to directly displace the top wall 635, such that movement of the top wall 635 also causes movement of the leading face 659 of the scrapers 657. In some examples, there can be a mechanical linkage between the top wall 635 and the scrapers 657 that causes such movement.

the position adjuster 640 can apply a force to the scrapers 657 to directly displace the scrapers 657, such that movement of the scrapers 657 also causes movement of the top wall 635. In some examples, there can be a mechanical linkage between the top wall 635 and the scrapers 657 that causes such movement.

the position adjuster 640 can apply a force to both the top wall 635 and the scrapers 657 to directly displace both the top wall 635 and the scrapers 657. In such examples, a mechanical linkage between the top wall 635 and the scrapers 657 may not be required.

The position adjuster 640 can enable (i) manual displacement of the top wall 635 and/or the leading face 659 of the scrapers 657; (ii) mechanically operated displacement of the top wall 635 and/or the leading face 659 of the scrapers 657, for example based on the position of a component of the baler, or forces exerted on a component of the baler; or (iii) automatic displacement, for example according to control signals received from the controller 652.

As will be discussed in more detail below, using the position adjuster 640 that can move both (i) one or more walls 635, 637 of the feeder duct 623; and (ii) the leading face 659 of the scrapers 657, can enable sophisticated operation of the baler during a baling operation in terms of improved efficiency and/or quality of bales.

As non-limiting examples, the position adjuster 640 can be provided as an actuator such as: hydraulic cylinder(s), pneumatic cylinder(s), electric actuator(s), electro-hydraulic actuator(s). Advantageously, the actuator can maintain the walls/components in a constant position when no crop is entering the machine. This can enable the baler to have improved operation when it starts collecting a new windrow after having turned in a headland. Also advantageously, the density of the crop in the conveying channel/feeder duct can be determined by monitoring the forces applied by the actuators. For example, a pressure feedback from a hydraulic actuator can be used to determine a force applied by a crop in the conveying channel/feeder duct. As will be discussed in detail below, the monitored force can then be used to control the baler.

Also, the position adjuster 640 can be provided as a mechanical device such as: spring(s), a spring-loaded mechanical coupling, a (timed) cam-lever system (which can be mechanically linked to the machine/plunger/stuffer or with an indirect actuator), a cam shaft (which can be mechanically linked to the machine or with an indirect actuator). Such examples may be particularly useful when they can provide a feeder-duct with a funnel-configuration and/or a reverse-funnel-configuration.

Particularly for examples where the position adjuster 640 is provided as an actuator, the controller 652 can activate the position adjuster 640. Such activation can be during a baling operation, or in advance of a baling operation while the baler is not in use. In this way, the volume of the feeder duct 623 and the volume of the conveying channel 645 can be adjusted.

Although a single position adjuster 640 is schematically shown in FIG. 6, it will be appreciated that the functionality of the position adjuster 640 can be provided by one or more components. For instance, a scraper position adjuster may be configured to move the scrapers 657, and a separate wall position adjuster may be configured to move a wall 635, 637 of the feeder duct 623.

As shown in FIG. 6, the controller 652 can activate the position adjuster 640 to move: (i) the top wall 635 and the bottom wall 637 further apart from each other, or closer together; and (ii) at least part of the leading face 659 of the scrapers 657 further apart from, or closer to, the rotor feeder unit bottom 642.

In this example, the top wall 635 is moved such that it remains generally parallel with the bottom wall 637. In this way, the feeder duct 623 has a parallel-configuration that has a substantially consistent cross-sectional area from the lower end 629 to the upper end 627 of the feeder duct 623, irrespective of the position of the top wall 635. This can be advantageous because it can enable a smooth flow of crop through the feeder duct, and also the feeder duct can be set such that a predetermined relationship between the number of plunger cycles per stuffer cycle is achieved. For example, in some applications a 1:1 ratio may be advantageous because a good degree of compression of the crop can be achieved. Also, by avoiding one or more unused plunger cycles (in that there is no slice of crop to be compacted into the bale in the bale chamber, it can be less likely that the feeder duct will be overfilled which can lead to crop spillage and/or a blockage of the feeder duct.

It will be appreciated that one or more mechanical linkages can be connected to the top wall 635 to ensure that it moves in the way shown in FIG. 6.

In this example, the leading face 659 of the scrapers 657 is rotated such that it moves relative to the rotor feeder unit bottom 642 in order to change the cross-sectional profile of the conveying channel 645; that is, the cross-sectional profile as it extends along the conveying direction through the rotor feeder unit 631. In at least some positions of the scrapers 657, the leading face 659 and the rotor feeder unit bottom 642 can diverge from each other, as they extend in the conveying direction, in order to define a reverse-funnel configuration. The position adjuster 640 can change the angle of divergence of the leading face 659 and the rotor feeder unit bottom 642. In some examples, the position adjuster 640 can set the angle between the leading face 659 and the rotor feeder unit bottom 642 such that they are generally parallel, or are convergent (not shown).

In this example, the leading face 659 of the scrapers 657 and the top wall 635 are movable in dependence on each other. Therefore, the leading face 659 of the scrapers 657 can be movable so as to provide a generally smooth transition between the leading face 659 and the top wall 635. That is, one without any significant steps or discontinuities. In this way, there can be a generally consistent upper surface at the transition between the conveying channel 645 and the feeder duct 623. This can advantageously reduce the likelihood of crop material getting trapped at the transition, can enable the feeder duct 623 to be better filled, and can reduce the load on the rotor feeder unit 631. Therefore, the energy required to provide a bale can also be reduced. Also, better quality bales, having a higher density of crop material, can be provided.

In some examples, the path along which the leading face 659 of the scrapers 657 and the top wall 635 are movable can be set such that they can abut each other at a plurality of different position, and therefore provide a continuous, generally gap-free, upper surface at the transition between the conveying channel 645 and the feeder duct 623. For instance, an axis of rotation about which the scrapers 657 can be set such that a path of movement of a distal edge of the leading face 659 corresponds to a path of movement of a distal edge of the top wall 635.

Figure 7:
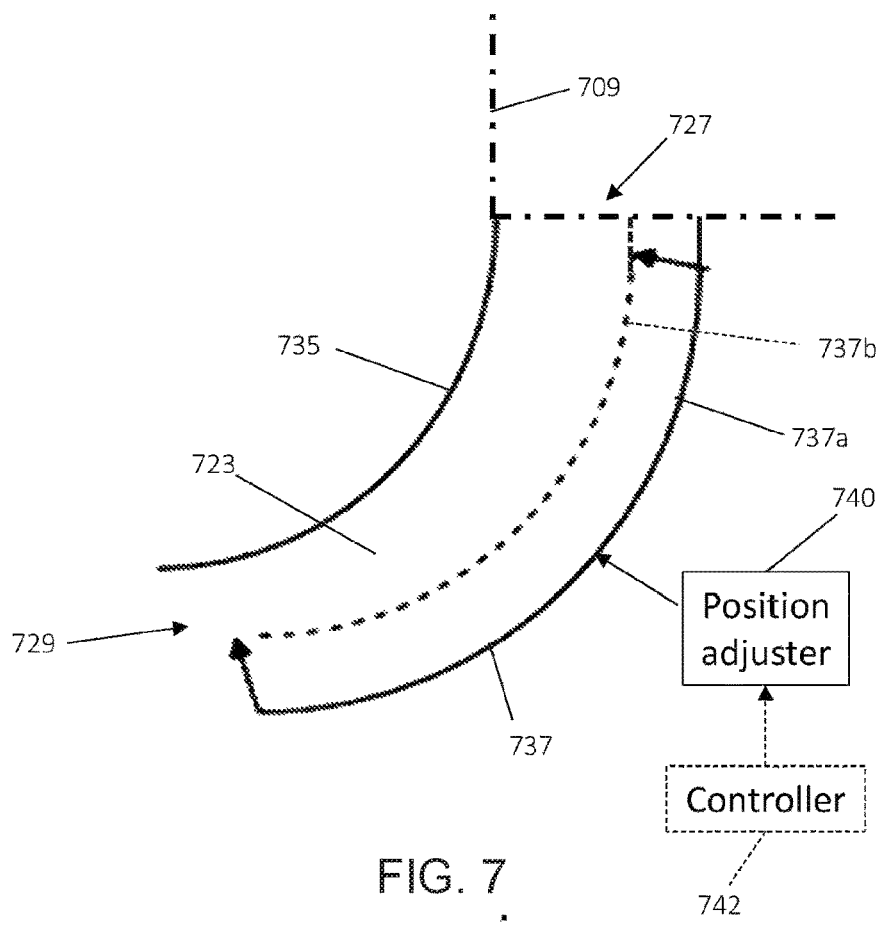
FIG. 7 shows part of an example embodiment of an agricultural baler, that is similar to FIG. 6.

FIG. 7 shows part of an example embodiment of an agricultural baler, that is similar to FIG. 6. Components of FIG. 7 that are also shown in FIG. 6 have been given corresponding reference numbers in the 700 series, and will not necessarily be described again here. The rotor feeder unit of FIG. 6 has been excluded from FIG. 7 in order to assist with the clarity of the illustration.

In this example, the bottom wall 737 is movable between a first position 737a and a second position 737b (shown with a dashed line in FIG. 7). In the first position 737a, the bottom wall 737 is further away from the top wall 735 than it is in the second position 737b. As above, the bottom wall 737 can be positioned at any one of a plurality of positions.

Although not shown in FIG. 7, the position adjuster 740 can also displace the leading face of scrapers of a rotor feeder unit relative to a rotor feeder unit bottom, in dependence on the displacement of the bottom wall 737 of the feeder duct 723.

It will be appreciated that in other examples, not shown, the functionality of FIGS. 6 and 7 can be combined. In this way, either or both of the top wall 735 and the bottom wall 737 can be movable, whilst retaining a generally parallel-configuration. The baler may include one or more position adjusters 740 for moving the top wall 735 and the bottom wall 737—for example, a single actuator 740 can be used to move both walls 735, 737; or a separate actuator 740 can be used for each wall 735, 737. In some embodiments, the top wall 735 and bottom wall 737 can be moved in dependence on each other—for example, if the top wall 735 is moved outwards (away from the bottom wall 737), then the bottom wall 737 is also moved outwards (away from the top wall 735); similarly, if the top wall 735 is moved inwards (towards the bottom wall 737), then the bottom wall 737 is also moved inwards (towards the top wall 735). For instance, if the actuators are provided as cylinders, then the cylinders can be linked (up and down) with each other so that if one is going in, the other is going out and vice versa. In some embodiments, the top wall 735 and the bottom wall 737 can be moved independently of each other.

In some examples, if the cross-section of the feeder duct 723 is reduced, then the distance 'under' and behind the rotor (with the scraper) can also be reduced. That is, the cross-section of the conveying channel (not shown in FIG. 7) can be adjusted based on the cross-section of the feeder duct 723. In some applications, this can be to avoid a funnel effect between the conveying channel and the feeder duct 723 that could obstruct the rotor. It can be advantageous to be able to precisely control the crop guidance into the feeder duct 723. For example, to take into account that a heart line/middle line of the conveying channel and the angle of the heart line of the feeder duct 723 can change. Therefore, it can be beneficial to have a movable rotor scraper to 'aim' the crops into a narrower inlet of the feeder duct (at the lower end 729) with respect to the changed heart line. The position of either or both of the top wall 735 and the bottom wall 737 can be set in combination with the position of the scrapers such that the rotor 'aims' the crop into a desired position of, or with a desired angle with reference to, the feeder duct 723.

Figure 8:
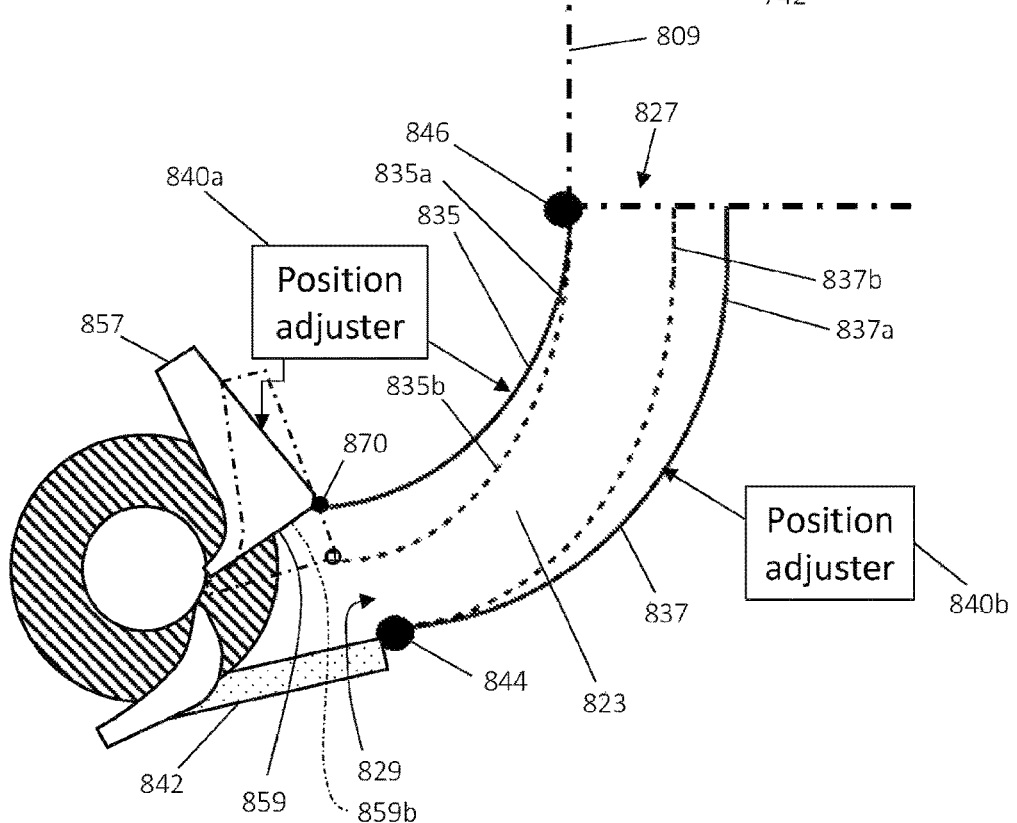
FIG. 8 shows part of another example embodiment of an agricultural baler, such as the baler illustrated in FIG. 1.

FIG. 8 shows part of another example embodiment of an agricultural baler, such as the baler illustrated in FIG. 1. FIG. 8 shows a feeder duct 823, a bale chamber 809, two position adjusters 840a, 840b, and a rotor feeder unit. The feeder duct 823 includes a top wall 835 and a bottom wall 837.

In this example, the top wall 835 is movable about a pivot between a first position 835a and a second position 835b (shown with a dashed line in FIG. 8). The pivot is provided by a top-wall-hinge 846 in this example, which is at the upper end 827 of the feeder duct. The upper end of the top wall 835, about which the wall pivots, can therefore remain stationary. In the first position 835a, the top wall 835 is further away from the bottom wall 837 than it is in the second position 835b. However, due to the pivot provided by the top-wall-hinge 846 (assuming that the bottom wall 837 remains stationary), a distal portion of the top wall 835 moves further way from the bottom wall 837 than a proximal portion of the top wall 835. The terms "distal" and "proximal" are relative to the pivot provided by the top-wall-hinge 846. In this example the distal portion of the top wall 835 is at the lower end 829 of the feeder duct, and the proximal portion of the top wall 835 is at the upper end 827 of the feeder duct.

The bottom wall 837 is also movable about a pivot between a first position 837a and a second position 837b (shown with a dashed line in FIG. 8). In other examples, only one of the top wall 835 and bottom wall 837 may be movable, and the other one may be fixed. The pivot is provided by a bottom-wall-hinge 844 in this example, which is at the lower end 827 of the feeder duct 823. The lower end of the bottom wall 837 therefore remains stationary. In the first position 837a, the bottom wall 837 is further away from the top wall 835 than it is when it is in the second position 837b. However, due to the pivot provided by the bottom-wall-hinge 844 (assuming that the top wall 835 remains stationary), a distal portion of the bottom wall 837 moves further way from the top wall 835 than a proximal portion of the bottom wall 837. The terms "distal" and proximal" are relative to the pivot provided by the bottom-wall-hinge 844. In this example the distal portion of the bottom wall 837 is at the upper end 829 of the feeder duct, and the proximal portion of the bottom wall 837 is at the lower end 827 of the feeder duct.

In this example, the top-wall-hinge 846 and the bottom-wall-hinge 844 are provided at opposite ends of the feeder duct 823. In this way, the top and bottom walls 835, 837 can both be moved towards each other, or away from each other, in order to maintain a generally parallel-configuration if they are moved by corresponding amounts. Alternatively, one or both of the top and bottom walls 835, 837 can be moved by different amounts to define a feeder duct 823 that has a variable cross-sectional area along its length from the lower end 829 to the upper end 827. In another example, the top-wall-hinge and the bottom-wall-hinge may be provided at the same ends of the feeder duct 823.

As above, it will be appreciated that the top wall 835 and the bottom wall 837 can be positioned at any one of a plurality of positions, and that they may be moved in correspondence with each other or independently.

In the same way as described with reference to FIG. 6, the leading face 859 of the scrapers 857 is movable relative to the rotor feeder unit bottom 842 between a first position (shown with a solid line) and a second position 859b (shown with a dot-dashed line). In this example, the top wall 835 is mechanically connected to the scrapers 857. More particularly, the top wall 835 is rotatably connected to the scrapers 857 by a hinge 870 such that the two components can rotate relative to each other. In this way, the position adjuster 840a may apply a force to only one of the top wall 835 and the scrapers 857 in order for them to move in dependence with each other. Also, this can advantageously ensure that there is no gap between the leading face 859 of the scrapers 857 and the top wall 835, irrespective of their positions. It will be appreciated that the scrapers and the top wall of any of the examples disclosed herein can be mechanically connected together in any way.

In some embodiments, the scrapers and the top wall of any of the examples disclosed herein may not be connected to each other; for instance they may be movable independently of each other. The scrapers and/or top wall may be connected to one or more of the frame, actuators, springs, hinges, etc., without being connected to each other.

Figure 9:
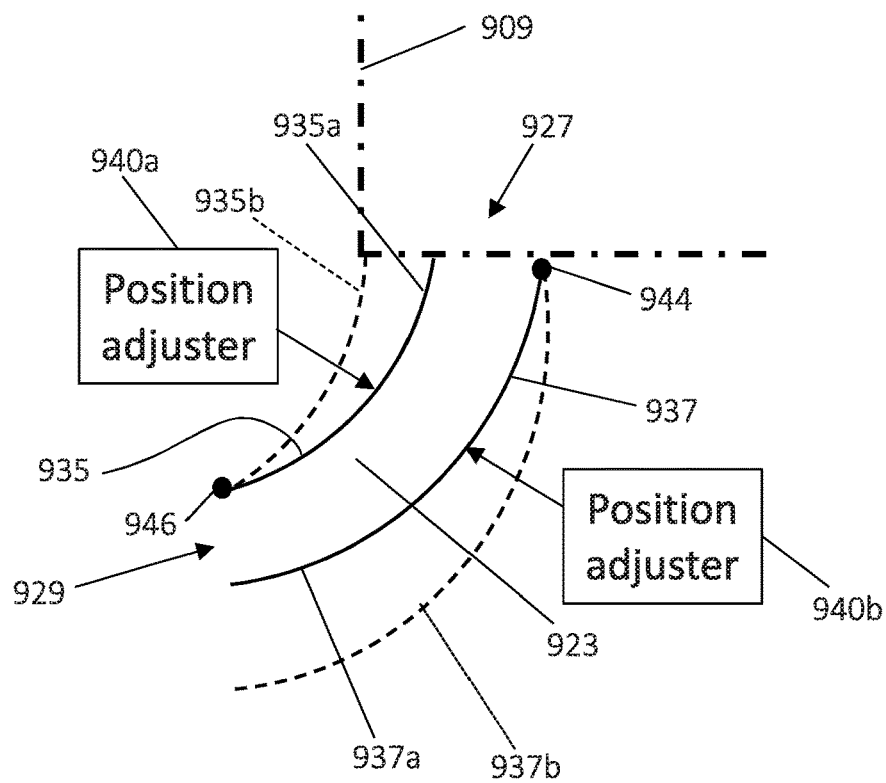
FIG. 9 shows part of a further example embodiment of an agricultural baler, which is similar to FIG. 8.

FIG. 9 shows part of a further example embodiment of an agricultural baler, which is similar to FIG. 8. Components of FIG. 9 that are also shown in FIG. 8 have been given corresponding reference numbers in the 900 series, and will not necessarily be described again here. The rotor feeder unit of FIG. 8 has been excluded from FIG. 9 in order to assist with the clarity of the illustration.

In this example the top wall 935 is pivotable about a top-wall-hinge 946, which is at the lower end 929 of the feeder duct 923. The lower end of the top wall 935 therefore remains stationary. The bottom wall 937 is pivotable about a bottom-wall-hinge 944, which is at the upper end 927 of the feeder duct 923. The upper end of the bottom wall 937 therefore remains stationary.

Although not shown in FIG. 9, one or both of the position adjusters 940a, 940b can also displace the leading face of scrapers of a rotor feeder unit relative to a rotor feeder unit bottom, in dependence on the displacement of the top and/or bottom wall 935, 937 of the feeder duct 923.

As discussed above, the position of either or both of the top wall 935 and the bottom wall 937 can be set in combination with the position of the scrapers such that the rotor 'aims' the crop into a desired position of, or with a desired angle with reference to, the feeder duct 923.

Figure 10:
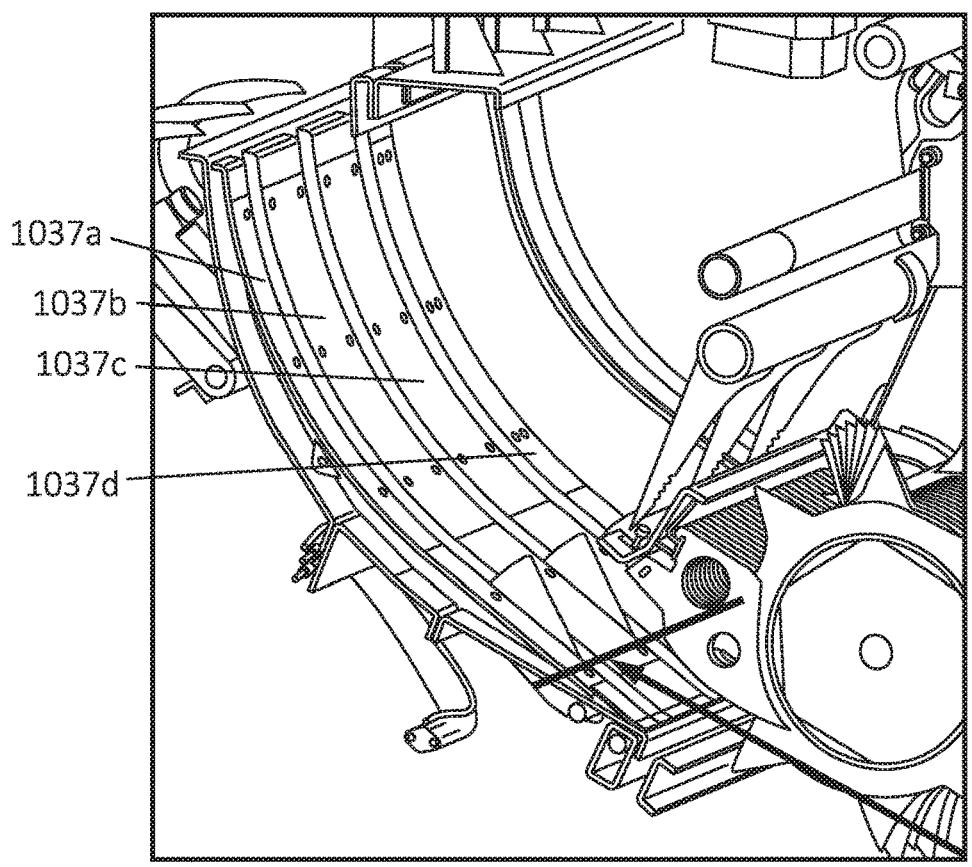
FIG. 10 shows part of another example embodiment of an agricultural baler.

FIG. 10 shows part of another example embodiment of an agricultural baler. In FIG. 10, the bottom wall is provided as a plurality of laterally spaced apart panels 1037a-d—four of which are shown in FIG. 10. In some examples there are gaps between the spaced apart panels 1037a-d, as shown in FIG. 10, so that a component such as a tine can access the feeder duct from the outside.

In other examples, the laterally spaced apart panels 1037a-d may be contiguous portions of a continuous wall, wherein the contiguous portions are separately movable towards or away from the opposing wall. In such examples, a contiguous portion may be joined to a neighbouring portion by an elastic material to maintain the continuity of the wall when the portions are not co-linear with each other.

The laterally spaced apart panels can include one or more inner panels and one or more outer panels. The inner panels are located towards a lateral centre of the feeder duct. The outer panels are located towards a lateral extremity of the feeder duct.

In such examples, one or more position adjusters may be associated with one or more subsets of the laterally spaced apart panels. In this way, the cross-sectional shape of the feeder duct can be adjusted. For example, a controller can activate any such position adjusters in any of the ways described herein. For instance, a position adjuster could move one or more of the inner panels more than one or more of the outer panels, such that the compression is higher in the centre (or it is more difficult for the crop to enter in the centre and it will be diverted more to the sides of the feeder duct).

In some examples, the gaps between the spaced apart panels 1037a-d can be occupied by insert-panels (not shown). That is, a top and/or bottom wall can also include insert-panels in the spaces between a plurality of laterally spaced apart panels. The insert-panels may extend along the entire length of the feeder duct, or only a portion of the feeder duct. One or more position adjusters may be associated with the insert-panels. This may be instead of or in addition to one or more position adjusters that are associated with the spaced apart panels 1037a-d. In this way, the insert-panels can be moved independently of the spaced apart panels 1037a-d. This can be considered as moving parts in/through the wall, instead of moving the full wall, such that the insert-panels can be pushed in or out the feeder duct with an actuator. With such a setup, more strength can be provided in the shape of the feeder duct whilst still retaining an ability to reduce the volume. Optionally, any such insert-panels can be rotatable about a pivot as described above.

Various control mechanisms for one or more of the position adjusters/actuators will now be described. It will be appreciated that any of the position adjusters described herein can be activated by a controller, and that at least some of the actuators/controllers described herein can perform a plurality of the control mechanisms. In at least some examples, when a wall of the feeder duct is moved, the leading face of the scrapers is also moved, even if not explicitly described. For example, the leading face of the scrapers can be moved so as to provide a generally smooth transition from the conveying channel to the feeder duct as described above.

As discussed above, a stuffer means can be operable according to a stuffer cycle. In which case, the controller can activate one or more position adjusters at one or more predetermined instants in time during a stuffer cycle of the stuffer means. For example, the controller can activate the one or more position adjusters to increase the volume of the feeder duct and/or conveying channel at a release-instant-in-time. The release-instant-in-time can be immediately before movement of the stuffer-tines from the stuffer-tine-start-position to the stuffer-tine-end-position; for instance a predetermined period of time before the stuffer-tines leave the stuffer-tine-start-position. Such a predetermined period of time can be less than 0.05 s, 0.1 s, 0.2 s, 0.5 s, 1 s or 2 s as non-limiting examples. In this way, the stuffer-tines can more easily transfer the crop from the feeder duct to the bale chamber because the friction applied to the crop slice by the top and bottom walls of the feeder duct can be reduced.

In some examples, at the release-instant-in-time, the controller can activate the one or more position adjusters to move the top wall and the bottom wall further apart from each other, at least at the upper end of the feeder duct. For example, the top and bottom walls can be moved to a position such that the feeder duct has a reverse-funnel-configuration. In a reverse-funnel-configuration, at least a portion of the feeder duct has an increasing cross-sectional area in a direction from the lower end to the upper end of the feeder duct. In other examples, the one or more position adjusters can move the entire top wall and the bottom wall further apart from each other at the release-instant-in-time, such that they generally remain parallel with each other.

Optionally, the controller can activate the one or more position adjusters to decrease the volume of the feeder duct and/or conveying channel at a compress-instant-in-time. The compress-instant-in-time can be immediately before (such as a predetermined period of time before) the release-instant-in-time, or a predetermined period of time before the stuffer-tines leave the stuffer-tine-start-position. Such a predetermined period of time can be less than 0.05 s, 0.1 s, 0.2 s, 0.5 s, 1 s or 2 s as non-limiting examples. At the compress-instant-in-time, the controller can activate the one or more position adjusters to move the top wall and the bottom wall closer together, at least at the upper end of the feeder duct. In this way, the crop in the feeder duct can be further compressed (it can be given a squeeze) before it is moved out of the feeder duct and into the bale chamber. This can represent another way of making it easier for the stuffer-tines to reduce the friction applied to the crop slice by the top and bottom walls for the stuffer cycle. In other examples, the one or more position adjusters can move the entire top wall and the bottom wall closer together at the compress-instant-in-time, such that they generally remain parallel with each other.

The controller can activate the one or more position adjusters to define a feeder duct and/or conveying channel that has a variable cross-sectional area along its length in between stuffer cycles. For example, the controller can activate the one or more position adjusters to define a feeder duct and/or conveying channel having a funnel-configuration in between stuffer cycles. In a funnel-configuration, at least a portion of the feeder duct has a decreasing cross-sectional area from the lower end to the upper end of the feeder duct. This can to make it easier for the rotor/stuffer means to fill the feeder duct and/or conveying channel, especially the upper end of the feeder duct, in that the stuffer means may require lower rotor torques.

At least some of the examples disclosed herein, including use of a funnel-configuration, can result in an improved bale shape. For instance, by creating a funnel, the top space and top corners of the feeder duct can be better filled and with a higher density of crop material. This can be because the rotor will be able to fill it better. Therefore, the formed bale can have a much better shape. In some applications, a perfect shape of bale is: perfectly square in side/top/front view, perfectly straight and flat in all directions, and with very sharp corners (between surfaces and all 8 corners of the bale). Therefore, an ability to fill the corners of the feeder duct in an improved way can assist in obtaining an improved bale shape.

In some examples the controller can activate the one or more position adjusters to define a feeder duct and/or conveying channel having a parallel-configuration, that has a substantially consistent cross-sectional area from the lower end to the upper end, in between stuffer cycles and after the feeder duct and/or conveying channel has been controlled to have a funnel-configuration. In this way, the top and bottom walls can be made parallel with each after an initial funnel-configuration. This can enable consistent filling of the feeder duct after the upper end of the feeder duct has been filled during the funnel-configuration.

In some applications, the controller can activate the one or more position adjusters to define a feeder duct and/or conveying channel having a reverse-funnel-configuration at an instant in time that is a predetermined period of time from an end of the stuffer cycle. At the end of the stuffer cycle, the stuffer-tines are at the stuffer-tine-end-position. In a reverse-funnel-configuration, at least a portion of the feeder duct and/or conveying channel has an increasing cross-sectional area in a direction from the lower end to the upper end of the feeder duct. This can make it easier for the rotor/stuffer means to empty the feeder duct, in that the stuffer means may require lower rotor torques.

As discussed above, a feeder means can be operable according to a feeder cycle. In some examples, the controller can activate the one or more position adjusters at one or more predetermined instants in time during a feeder cycle of the feeder means. The position adjusters can be activated in any way described herein that assists with the feeding of crop material into the feeder duct and/or conveying channel, including to provide one or more of a reverse-funnel-configuration, a funnel-configuration or a parallel-configuration, either individually or in sequence, either during or in between feeder cycles.

As discussed above, a plunger can be operable according to a plunger cycle. In some examples, the controller can activate the one or more position adjusters at one or more predetermined instants in time during the plunger cycle. The controller can activate the one or more position adjusters to increase the volume of the feeder duct at a release-instant-in-time, wherein the release-instant-in-time is immediately before the plunger moves from the retracted position towards the extended position. Immediately before can be a predetermined period of time before the plunger moves from the retracted position towards the extended position. Such a predetermined period of time can be less than 0.05 s, 0.1 s, 0.2 s, 0.5 s, is or 2 s as non-limiting examples. In some applications, the controller can activate the one or more position adjusters to decrease the volume of the feeder duct at a compress-instant-in-time, wherein the compress-instant-in-time is immediately before the release-instant-in-time, or before the plunger moves from the retracted position towards the extended position.

In this way, the controller can activate one or more position adjusters at one or more instants in time during one or more of the operational cycles of the baler.

In some embodiments, instead of using an electronic controller and actuator as described above, the baler may include a mechanical actuator for moving the top wall and/or the bottom wall and/or the leading face of the scrapers in any manner described herein.

In some examples, the controller can activate the one or more actuators based on a measured parameter during the baling operation. Such measured parameters can include one or more of:

tractor speed. For example, if the tractor speed is changed, then more or less crop material is entering the machine. Therefore, the controller can activate the one or more actuators in order to actively adapt to the volume of the feeder duct and/or conveying channel based on the amount of crop material that is entering the feeder duct and/or conveying channel.

rotor torque. In some applications, the rotor torque can be limited with a clutch. If the rotor torque is increasing or too high, then the controller can activate the one or more actuators to increase the volume of the feeder duct and/or conveying channel. In this way, the rotor torque can be lowered. Also, this can reduce the likelihood that the clutch will cut-out the rotor rotation, which can result in the driver having to interrupt a baling operation. Also, if the rotor torque is too low or decreasing, this can be representative of the density of crop material in the feeder duct and/or conveying channel being too low, and the controller can decrease the volume of the feeder duct and/or conveying channel.

stuffer torque. In some applications, the stuffer torque can be limited with a shear-bolt. If the stuffer torque is too high, such that the shear-bolt is about to break, the controller can increase the volume of the feeder duct and/or conveying channel. This can reduce the likelihood of the shear-bolt breaking. If the stuffer torque is too low, then this can be representative of the density of crop material in the feeder duct and/or conveying channel being too low, and the controller can decrease the volume of the feeder duct and/or conveying channel.

plunger force. The controller can adjust the volume of the feeder duct and/or conveying channel based on the plunger force, for instance to provide a more efficient baling process. In some applications if a low plunger force is detected, then there can be advantages to reducing the volume of the feeder duct and/or conveying channel. In other applications if a low plunger force is detected, then there can be advantages to increasing the volume of the feeder duct and/or conveying channel. For instance, high plunger forces can occur when there is a large volume crop material in the baling chamber that requires compression. Also, high plunger forces can occur when there a lower volume of crop material in the baling chamber. This is because the crop material is not capable of being compressed very much; for instance due to high pre compression in the feeder duct and/or the physical limitations on how much a thin slice of crop material can be compressed. Particularly, for this example, the controller can determine how to activate the one or more actuators based on a combination of the plunger force and one or more other measured parameters—for instance to determine why a high plunger force is being detected.

top door height. The "top door" of a baler can also be referred to as the ceiling of the bale chamber. The top door height, at least in part, defines the bale shape and density. It can be advantageous for the volume of the feeder duct and/or conveying channel to be directly related to the top door height. Therefore, the controller can set the volume of the feeder duct and/or conveying channel as a function of the top door position/height.

crop type and moisture. For wet crops and specific types of crops, the friction between the crop material and a wall over which it passes (including a wall of the feeder duct and/or conveying channel) is higher. Therefore, there can be advantages for the volume/cross-section of the feeder duct and/or conveying channel to be larger for wet crops than it is for dry crops. Also, for voluminous crops, the feeder duct and/or conveying channel can be set so as to have a larger volume/cross-section PBC that for 'dead' crops.

bale shape. The controller can set the volume of the feeder duct and/or conveying channel based on bale shape.

crop pressure within feeder duct. The controller can adjust the volume of the feeder duct and/or conveying channel in order to maintain the crop pressure within a predetermined range of values. For instance, if the crop pressure is too low, then the volume can be reduced in order to increase the crop pressure; and if the crop pressure is too high, then the volume can be increased in order to reduce the crop pressure.

It will be appreciated that any reference to "close to", "before", "after", "high", "low", "increasing" or "decreasing", etc, can refer to the parameter in question (or a derivative of the parameter in question) being less than or greater than a threshold value, or between two threshold values, depending upon the context.

In some examples, the controller can activate the one or more actuators based on an instruction provided by an operator. For instance, there could be preset operational modes that an operator can choose between, which activate one or more of the control mechanisms described above. In this way, the operator can choose a preset operational mode to: reduce the wear on the machine; or the noise generated by the machine; or the comfort of driving, as non-limiting examples. Such preset modes can be comfort mode, eco mode, high density mode, etc. In some examples, the operator may be able to provide user input that is based on their experience to ensure that the controller takes what they consider to be appropriate action in relation to controlling the volume of the feeder duct and/or conveying channel. Also, the operator can provide input if the controller fails, or if the operator wants to manually take over.

In some examples, a door is provided that defines at least a portion of the bottom wall of the feeder duct. The door can be movable between: (i) a door-open-position, in which an opening in the bottom wall is provided; and (ii) a door-closed-position in which the opening is closed. The door will be in the door-closed-position during normal use such that the feeder duct can communicate the crop material to the bale chamber. If a blockage in the feeder duct occurs, then the baler can be stopped and the door can be moved to the door-open-position. An operator can then manually remove the blockage and clean out the feeder duct. The door can also be referred to as a drop floor.

In some applications, the door can be the same component as a part of the bottom wall that is configured to be moved by the one or more actuators in order to adjust the volume of the feeder duct, as described herein. In such applications, when a blockage occurs in the feeder duct, the controller can move the bottom wall to a door-open-position such that the blockage can be manually removed by an operator. Such a door-open-position may correspond to a most outward position of the bottom wall, under the operation of the one or more actuators.

In some examples, it can be advantageous for the cutting unit/drawer to be openable to increase the size of an opening that an operator can use to access the feeder duct to clear any blockages which are located closer to the cutting unit or the pick-up device. Providing an openable cutting unit/drawer can be advantageous because it can provide direct access to a region of the feeder duct that can be most likely to become blocked in some applications.

In other examples, the baler may have a packer unit instead of a cutting unit. When a packer unit is used, the cutting drawer described above may be replaced by a plate/drawer that does not have any knives.

Figure 11:
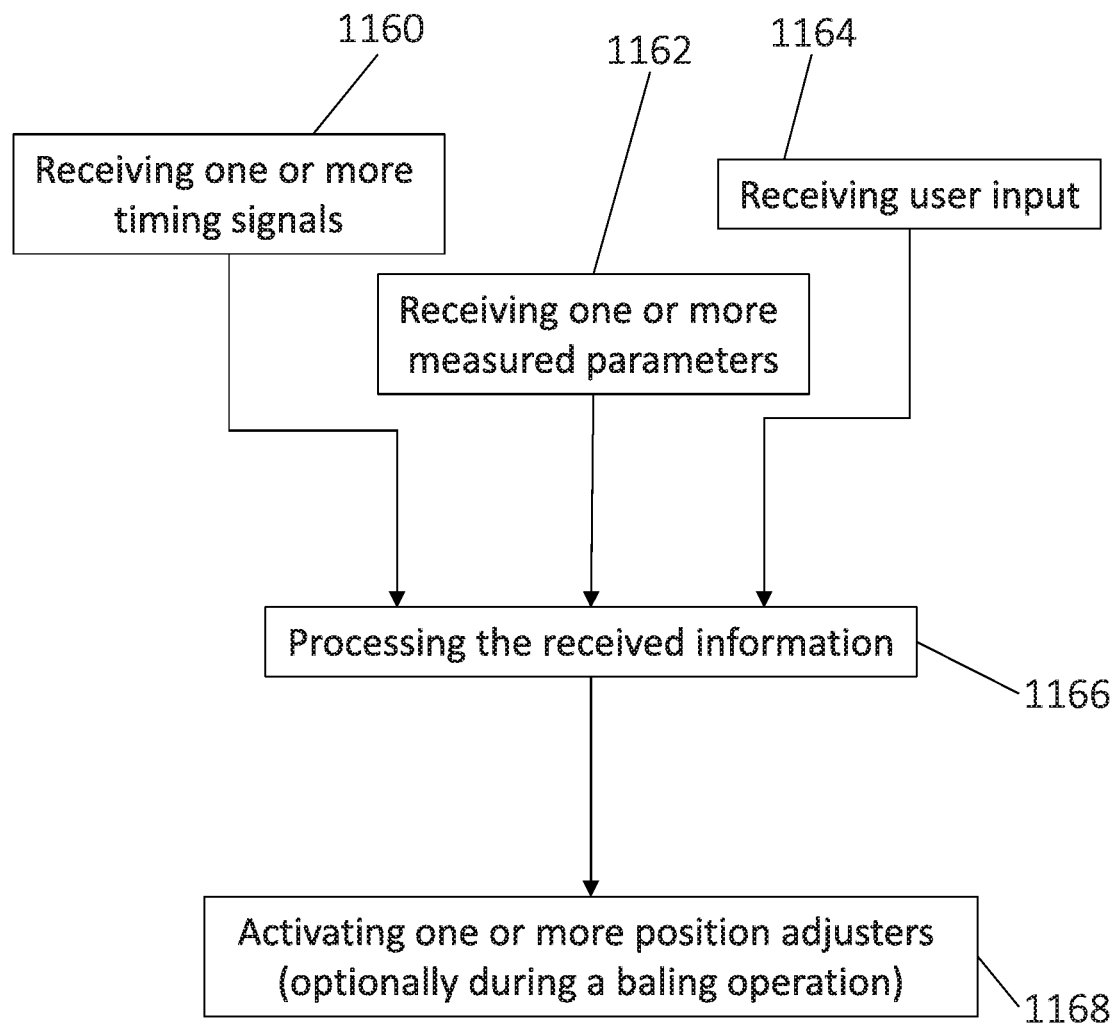
FIG. 11 shows schematically an example of a method for operating a baler.

FIG. 11 shows schematically an example of a method for operating an agricultural baler, such as the ones described herein, which can be implemented by a controller.

The method in this example begins with one or more of the steps of: (i) receiving one or more timing signals (step 1160), such as signals representative of an operation cycle of the baler; (ii) receiving one or more measured parameters (step 1162), such as the various parameters that are described above; and (iii) receiving user input (step 1164), such as selection of a preset operational mode as discussed above.

Then, at step 1166, the method involves processing the received information, for instance in order to provide control signals for one or more position adjusters that are configured to move a top wall and/or a bottom wall of the feeder duct, and also to move a leading face of scrapers. At step 1168, the method includes activating the one or more position adjusters in order to adjust the volume of the feeder duct and a conveying channel that is bounded by the leading face of the scrapers. This step can be performed during a baling operation, while the baler is stationary in advance of a baling operation, or during a pause partway through a baling operation.

The invention claimed is:
1. An agricultural baler, comprising:
a bale chamber for the compression of crop material into bales, the bale chamber having a floor, a ceiling, a first wall, and a second wall, wherein a bale forming direction of the bale chamber extends from an inlet end to an outlet end of the bale chamber, and wherein the floor comprises an inlet opening;

a plunger for forcing the crop material from the inlet end of the bale chamber towards the outlet end of the bale chamber;

a feeder duct communicating with the bale chamber through the inlet opening for charges of crop material to be transferred from the feeder duct into the bale chamber, the feeder duct having an upper end facing generally upwardly and communicating with the inlet opening in the bale chamber and a lower end facing generally in a forward direction, the feeder duct further having a top wall and a bottom wall extending between the lower end and the upper end of the feeder duct, wherein the top wall or the bottom wall are movable in order to adjust a volume of the feeder duct;

a rotor feeder unit comprising:
   a rotor feeder carrying a set of tines, the rotor feeder rotatable about an axis of rotation;
   a rotor feeder unit bottom distant from the rotor feeder forming a lower boundary of a conveying channel through the rotor feeder unit;
   a plurality of cutting blades, each of the cutting blades extending between the tines; and
   scrapers placed in a conveying direction behind the rotor feeder, the scrapers extending in between the tines and having a leading face cooperating with the tines; and a position adjuster configured to:
   displace the leading face of the scrapers relative to the rotor feeder unit bottom, and
   displace the top wall or the bottom wall of the feeder duct, in order to adjust the volume of the feeder duct, wherein the position adjuster is configured to displace the leading face of the scrapers and the top wall or the bottom wall of the feeder duct in dependence on each other.

2. The agricultural baler of claim 1, wherein the position adjuster is further configured to rotate the scrapers about an axis of rotation in order to adjust a cross-sectional profile of the conveying channel as it extends in a conveying direction through the rotor feeder unit.

3. The agricultural baler of claim 1, wherein the position adjuster is further configured to rotate the scrapers about an axis of rotation that is offset from the axis of rotation of the rotor feeder, for angularly displacing the leading face of the scrapers relative to the rotor feeder unit bottom.

4. The agricultural baler of claim 1, wherein a path of movement of a distal edge of the leading face corresponds to a path of movement of a distal edge of the top wall.

5. The agricultural baler of claim 1, wherein the position adjuster is configured to displace the leading face of the scrapers and the top wall of the feeder duct so as to provide a generally smooth transition between the leading face and the top wall.

6. The agricultural baler of claim 1, wherein the top wall is mechanically connected to the scrapers.

7. The agricultural baler of claim 1, further comprising a controller configured to activate the position adjuster, wherein the controller is configured to activate the position adjuster during a baling operation.

8. The agricultural baler of claim 7, wherein the controller is configured to activate the position adjuster at one or more instants in time during an operational cycle of the baler.

9. The agricultural baler of claim 8, further comprising a stuffer operable to convey crop material from the feeder duct through the inlet opening and into the bale chamber, wherein the controller is configured to activate the position adjuster at one or more predetermined instants in time during a stuffer cycle of the stuffer.

10. The agricultural baler of claim 8, further comprising a feeder operable to convey crop material from the lower end of the feeder duct toward the upper end, wherein the controller is configured to activate the position adjuster at one or more predetermined instants in time during a feeder cycle of the feeder.

11. The agricultural baler of claim 8, wherein the controller is configured to activate the position adjuster at one or more predetermined instants in time during a plunger cycle of the plunger.

12. The agricultural baler of claim 1, wherein the position adjuster is adapted for manual operation thereof.

13. The agricultural baler of claim 1, further comprising a controller configured for controlling the position adjuster and at least one sensor for measuring at least one operational parameter of the rotor feeder unit or of the agricultural baler in which the rotor feeder unit is arranged, wherein the controller is further configured for receiving measuring data from the sensor and for displacing the leading face of the scrapers relative to the rotor feeder unit bottom, the top wall, or the bottom wall of the feeder duct based on the at least one operational parameter.

14. The agricultural baler of claim 13, wherein the at least one operational parameter comprises a parameter related to a mechanical load on the rotor feeder unit during operation.

15. The agricultural baler of claim 14, wherein the controller is further configured to displace the leading face of the scrapers relative to the rotor feeder unit bottom so that a reverse funnel shape of the end of the conveying channel is widened in case the load on the rotor feeder exceeds a certain predetermined value.

16. The agricultural baler of claim 1, wherein the position adjuster is further configured to allow displacement of the leading face of the scrapers relative to the rotor feeder unit bottom as a function of a force exerted by crop material on the leading face of the scrapers.

17. The agricultural baler of claim 1, wherein the position adjuster is further configured to rotate the scrapers about the axis of rotation of the rotor feeder for angularly displacing the leading face of the scrapers relative to the rotor feeder unit bottom.

18. The agricultural baler of claim 1, wherein the position adjuster is configured to displace the leading face of the scrapers relative to the rotor feeder unit bottom such that an angle of the leading face of the scrapers relative to the leading face of the tines is adjusted.

19. A method for operating an agricultural baler, the baler comprising:
   a bale chamber for the compression of crop material into bales, the bale chamber having a floor, a ceiling, a first wall, and a second wall, wherein a bale forming direction of the bale chamber extends from an inlet end to an outlet end of the bale chamber, and wherein the floor comprises an inlet opening;
   a plunger for forcing the crop material from the inlet end of the bale chamber towards the outlet end of the bale chamber;
   a feeder duct communicating with the bale chamber through the inlet opening for charges of crop material to be transferred from the feeder duct into the bale chamber, the feeder duct having an upper end facing generally upwardly and communicating with the inlet opening in the bale chamber and a lower end facing generally in a forward direction, the feeder duct further having a top wall and a bottom wall extending between the lower end and the upper end of the feeder duct, wherein the top wall or the bottom wall are movable in order to adjust a volume of the feeder duct; and a rotor feeder unit comprising:
- a rotor feeder carrying a set of tines, the rotor feeder rotatable about an axis of rotation;
- a rotor feeder unit bottom distant from the rotor feeder forming a lower boundary of a conveying channel through the rotor feeder unit;
- a plurality of cutting blades, each of the cutting blades extending between the tines; and
- scrapers placed in a conveying direction behind the rotor feeder, the scrapers extending in between the tines and having a leading face cooperating with the tines, wherein the method comprises:
- displacing the leading face of the scrapers relative to the rotor feeder unit bottom by a position adjuster, and
- displacing the top wall or the bottom wall of the feeder duct by the position adjuster, in order to adjust the volume of the feeder duct, wherein the position adjuster is configured to displace the leading face of the scrapers and the top wall or the bottom wall of the feeder duct in dependence on each other.

* * * * *